US012673002B2

(12) United States Patent
Sigsworth et al.

(10) Patent No.: US 12,673,002 B2
(45) Date of Patent: Jul. 7, 2026

(54) SAFETY CONTROL FOR MOBILITY DEVICE

(71) Applicant: StairAssist Walker, Inc., Scituate, MA (US)

(72) Inventors: Joshua Sigsworth, Scituate, MA (US); Matthew Gingras, Middletown, CT (US); Eric Ankerud, Hollis, NH (US); Brian Morin, North Reading, MA (US); Dan Becker, Haverhill, MA (US); Mark Brodie, Hingham, MA (US); Leland Ray Adams, Woodbridge, CT (US); Joseph Paul, Thomaston, CT (US); Amy T. Potts, Westford, MA (US); J. Derek Riemer, Westford, MA (US)

(73) Assignee: StairAssist Walker, Inc., Scituate, MA (US)

( * ) Notice: Subject to any disclaimer, the term of this patent is extended or adjusted under 35 U.S.C. 154(b) by 313 days.

(21) Appl. No.: 18/368,626

(22) Filed: Sep. 15, 2023

(65) Prior Publication Data

US 2024/0115455 A1 Apr. 11, 2024

Related U.S. Application Data

(63) Continuation of application No. 17/592,731, filed on Feb. 4, 2022, now Pat. No. 11,759,385.

(Continued)

(51) Int. Cl.
*A61H 3/04* (2006.01)
*A61H 3/00* (2006.01)

(52) U.S. Cl.
CPC ......... *A61H 3/04* (2013.01); *A61H 2003/001* (2013.01); *A61H 2003/043* (2013.01);

(Continued)

(58) Field of Classification Search
CPC ................ A61H 3/04; A61H 2003/001; A61H 2003/043; A61H 2201/0173; A61H 2201/5025; A61H 2201/0192
See application file for complete search history.

(56) References Cited

U.S. PATENT DOCUMENTS 3,387,618 A 6/1968 Swann
3,455,313 A * 7/1969 King ........................ A61H 3/00 135/67

(Continued)

FOREIGN PATENT DOCUMENTS

CN 111920656 A 11/2013

OTHER PUBLICATIONS

User Manual Roami Progressive Mobility Aid, Mobilate LLC, 37 pages, downloaded Mar. 8, 2024 from website: roamiwalkers.com.

*Primary Examiner* — Erez Gurari
(74) *Attorney, Agent, or Firm* — Christensen, Fonder, Dardi & Busse PLLC; John P. Fonder

(57) ABSTRACT

A mobility device configurable in a first walk configuration and a second stair-climb configuration, including a frame with movable front leg portions, a leg-actuation system connected to the front leg portions and a safety-control device mounted to the frame. The safety-control device includes a configuration selector, and a lever connected to the leg-actuation system and configured to actuate the cable actuation system so as to cause the first and second movable leg portions to move from a first position to a second position. The lever remains locked in a first lever position such that the lever cannot be moved unless the configuration selector is in a depressed position, thereby preventing inadvertent movement of the leg portion.

24 Claims, 14 Drawing Sheets

Related U.S. Application Data

(60) Provisional application No. 63/145,673, filed on Feb. 4, 2021.

(52) U.S. Cl.
CPC ................ *A61H 2201/0173* (2013.01); *A61H 2201/5025* (2013.01)

(56) References Cited

U.S. PATENT DOCUMENTS

| | | | | |
|---|---|---|---|---|
| 3,800,815 | A * | 4/1974 | Birk | A61H 3/00 135/67 |
| 4,094,331 | A | 6/1978 | Rozsa | |
| 4,415,198 | A | 11/1983 | Brearley | |
| 4,452,484 | A | 6/1984 | Pastor | |
| 4,777,973 | A * | 10/1988 | Nakajima | A61H 3/00 482/66 |
| 4,941,496 | A | 7/1990 | Berning | |
| 5,263,506 | A | 11/1993 | Narramore | |
| 5,349,977 | A * | 9/1994 | Wood | A61H 3/00 135/69 |
| 5,443,304 | A | 8/1995 | Fochs | |
| 5,499,856 | A | 3/1996 | Sorrell et al. | |
| 5,649,558 | A * | 7/1997 | Richard | A61H 3/00 135/69 |
| 5,787,913 | A | 8/1998 | Li | |
| 6,030,039 | A | 2/2000 | Essler | |
| 6,145,524 | A * | 11/2000 | Li | A61H 3/00 135/69 |
| 6,338,493 | B1 | 1/2002 | Wohlgemuth et al. | |
| 6,371,142 | B1 | 4/2002 | Battiston | |
| 6,401,738 | B1 | 6/2002 | Alexander | |
| 6,729,342 | B2 | 5/2004 | Serhan | |
| 7,779,850 | B2 | 8/2010 | Caldwell | |
| 7,988,157 | B2 | 8/2011 | Rembos et al. | |
| 8,667,976 | B2 * | 3/2014 | Huang | A61H 3/00 135/67 |
| 8,720,914 | B1 | 5/2014 | Heath et al. | |
| 8,820,338 | B1 * | 9/2014 | Catricala | A61H 3/00 135/75 |
| 8,936,033 | B2 | 1/2015 | Velarde | |
| 9,468,579 | B1 | 10/2016 | Fulkerson | |
| 9,486,383 | B1 | 11/2016 | Pichnarcik | |
| 9,545,354 | B1 * | 1/2017 | Klausmeyer | A61H 3/00 |
| 9,649,523 | B2 | 5/2017 | Brady | |
| 9,707,149 | B1 | 7/2017 | Juarez | |
| 9,839,570 | B2 * | 12/2017 | O'Sullivan | A61H 3/04 |
| 9,895,281 | B1 | 2/2018 | Sigsworth et al. | |
| 10,092,475 | B2 | 10/2018 | Smith | |
| 10,278,884 | B1 | 5/2019 | Gingras et al. | |
| 10,500,121 | B2 * | 12/2019 | Triolo | A61H 3/00 |
| 10,688,013 | B2 | 6/2020 | Joles et al. | |
| 11,707,401 | B2 * | 7/2023 | Triolo | A61H 3/00 135/67 |
| 11,759,385 | B2 | 9/2023 | Sigsworth et al. | |
| 11,883,348 | B2 | 1/2024 | Joles et al. | |
| 2008/0129016 | A1 | 6/2008 | Willis | |
| 2011/0232665 | A1 | 9/2011 | Barnett, Jr. | |
| 2012/0298160 | A1 * | 11/2012 | Hamilton | A61H 3/00 135/66 |
| 2013/0061894 | A1 | 3/2013 | Liu | |
| 2014/0109944 | A1 * | 4/2014 | Triolo | A61H 3/00 135/67 |
| 2014/0137912 | A1 | 5/2014 | Kline | |
| 2016/0158080 | A1 | 6/2016 | Tsushima | |
| 2018/0021200 | A1 | 1/2018 | Orndorff | |
| 2019/0015273 | A1 | 1/2019 | Linon | |
| 2019/0282423 | A1 | 9/2019 | Nam et al. | |
| 2020/0100979 | A1 | 4/2020 | Joles et al. | |
| 2020/0246210 | A1 * | 8/2020 | Brodie | A61H 3/00 |
| 2021/0016450 | A1 | 1/2021 | Fan | |
| 2021/0369538 | A1 | 12/2021 | Bellin | |
| 2022/0241134 | A1 * | 8/2022 | Sigsworth | A61H 3/04 |
| 2022/0339054 | A1 * | 10/2022 | Rock | A61H 1/00 |
| 2023/0136051 | A1 * | 5/2023 | Sullivan | A61H 3/04 135/75 |

* cited by examiner

SAFETY CONTROL FOR MOBILITY DEVICE

CROSS-REFERENCE TO RELATED APPLICATIONS

This application is a continuation of U.S. patent application Ser. No. 17/592,731 entitled SAFETY CONTROL FOR MOBILITY DEVICE, filed Feb. 4, 2022, which claims the benefit of U.S. Provisional Application No. 63/145,673, filed Feb. 4, 2021, both of which are incorporated by reference herein in their entireties.

FIELD OF THE INVENTION

The present invention relates generally to patient mobility apparatus safety components, more specifically, but not by way of limitation, a safety-control device for a mobility device, wherein the safety-control device allows a practitioner to regulate whether or not a user of a mobility apparatus can utilize the mobility apparatus in either a first configuration or second configuration.

BACKGROUND

Many patients either after surgery, or for a particular condition, will have weight-bearing or other restrictions placed on them by their health care practitioner. Weight-bearing restriction orders can range from the patient not being allowed to place any weight on a limb or being limited as to how much weight and time can be placed on a limb. Patients with these conditions will often undergo physical therapy for an extended period of time. Much of the physical therapy occurs in the patient's home. Various challenges occur when managing a patient who has weight-bearing restrictions on a limb once the patient is at home. Typically, a patient's home is not configured with various structural elements and as such they will utilize a mobility device such as, but not limited to, a walker to traverse through the interior of their home.

Stairs present a unique challenge for patients that have weight-bearing restriction orders, or other patients, including the elderly, amputees and so on. While there are mobility devices that can assist a patient to traverse the stairs, it may not be desirable for the patient to do so unattended. During healthcare visits to a patient's home, a practitioner may desire to work with a patient on traversing stairs but the patient may not be physically capable of executing this activity while unattended. Known devices that are configured to facilitate traversing of stairs are typically configured to transition between a first mode or configuration and a second mode or configuration wherein one configuration provides a device configuration for traversing a flat surface and the alternate, second configuration provides a device configuration for traversing stairs. One problem with these devices is their inability for a practitioner to control which configuration is available for a patient whether in the presence of the practitioner or in the absence thereof.

Accordingly, there is a need for safety-control devices and systems for mobility devices that are configured to provide regulation as to whether or not a user can transition the mobility device between a first configuration and a second configuration.

SUMMARY OF THE INVENTION

It is an object of the present invention to provide a safety control for mobility devices that is configured to facilitate regulation of an ability of a user to utilize the mobility device in a first configuration or a second configuration wherein the present invention is integrally mounted to a mobility device, such as a walker.

Another object of the present invention is to provide a safety-control device for a mobility device that allows a practitioner to govern what configuration the mobility device can be placed in, wherein the present invention includes a lever handle integrally mounted to the frame of the mobility device.

A further object of the present invention is to provide a safety-control device for mobility devices that is configured to facilitate regulation of an ability of a user to utilize the mobility device in a first configuration or a second configuration, wherein the lever handle is movably mounted to a barrel housing.

Still another object of the present invention is to provide a safety-control device for a mobility device that allows a practitioner to govern what configuration the mobility device can be placed in, and that further includes a barrel member movably disposed within the interior volume of the barrel housing.

An additional object of the present invention is to provide a safety-control device for mobility devices that is configured to facilitate regulation of an ability of a user to utilize the mobility device in a first configuration or a second configuration, wherein the barrel member further has a locking pin operably coupled thereto.

Yet a further object of the present invention is to provide a safety-control device for a mobility device that allows a practitioner to govern what configuration the mobility device can be placed in, wherein the frame further includes a safety clip assembly operably coupled thereto.

Another object of the present invention is to provide a safety-control device for mobility devices that is configured to facilitate regulation of an ability of a user to utilize the mobility device in a first configuration or a second configuration, wherein the safety clip assembly includes a clip member that is operable to engage the locking pin.

An alternate object of the present invention is to provide a safety-control device for a mobility device that allows a practitioner to govern what configuration the mobility device can be placed in, wherein the clip member of the safety clip assembly is operable to be inhibited from movement by a clip member guard, wherein the clip member guard is movable between a first position and a second position.

In an another embodiment, the disclosure includes a mobility device configurable in a first configuration for assisting a user to traverse a flat surface, and configurable in a second configuration for assisting a user to climb stairs. In this embodiment, the mobility device includes: a frame including a first rear leg, a second rear leg, a first front leg having a first movable leg portion, and a second front leg having a second movable leg portion, each of the first movable leg portion and the second movable leg portion movable between a first leg position and a second leg position; a leg-actuation system connected to the first and second pivoting leg portions; and a safety-control device mounted to the frame. The safety-control device includes: a configuration selector movable between a first configuration-selector position and a second configuration-selector position; and a lever connected to the leg-actuation system and movable between a first lever position and a second lever position, the lever configured to actuate the leg-actuation system so as to cause the first and second movable leg portions to move from the first leg position to the second leg position when the lever is moved from the first lever position to the second lever position.

The mobility device is in the first configuration when the configuration selector is in the first configuration-selector position, the lever is in the first lever position, and the first and second pivoting leg portions are in the first leg position. The mobility device is in the second configuration when the lever is in the second lever position and the first and second movable leg portions are in the second leg position. Further, the lever remains locked in the first lever position such that the lever cannot be moved from the first lever position to the second lever position, thereby preventing movement of the first and second movable leg portions from the first leg position to the second leg position, when the configuration selector is in the first configuration-selector position.

An embodiment of the disclosure also includes a safety-control device for a mobility device that includes a pair of movable front legs, the mobility device being configurable in a first configuration such that the movable front legs are in a first leg position, and configurable in a second configuration such that the movable front legs are in a second leg position. The safety-control device comprises: a configuration selector defining a configuration-selector axis, the configuration selector movable in a radial direction and in an axial direction, the configuration selector configured to be positioned in a first configuration-selector position, a second configuration-selector position, and a third configuration-selector position; a housing including a first housing portion and a second housing portion, the first housing portion comprising a configuration-selector receiving recess configured to receive at least a portion of the configuration selector; and a lever connected to the cable actuation system and movable between a first lever position and a second lever position, the lever configured to actuate the leg-actuation system so as to cause the first and second movable leg portions to move from the first leg position to the second leg position when the lever is moved from the first lever position to the second lever position. The lever is in a locked in place while in the first lever position such that the lever cannot be moved from the first lever position to the second lever position, thereby preventing movement of the first and second movable leg portions from the first leg position to the second leg position, when the configuration selector is in the first configuration-selector position.

To the accomplishment of the above, and related objects, the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
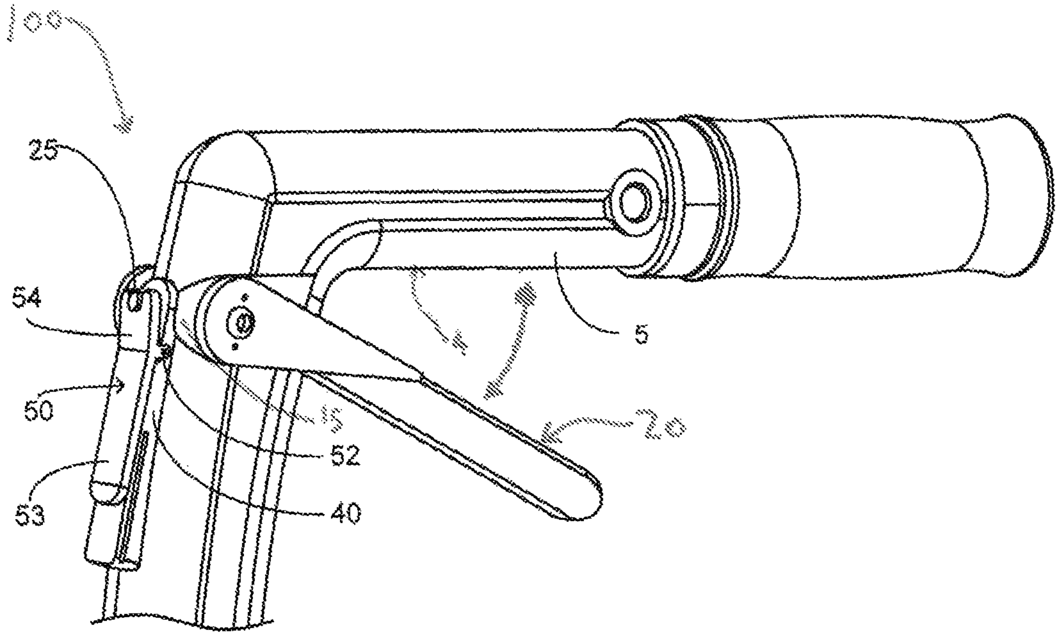
FIG. 1 is a detailed view of the present invention with the clip member guard removed, according to an embodiment.

Referring now to the drawings submitted herewith, wherein various elements depicted therein are not necessarily drawn to scale and wherein through the views and figures like elements are referenced with identical reference numerals, there is illustrated a mobility device safety-control device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example, but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 3:
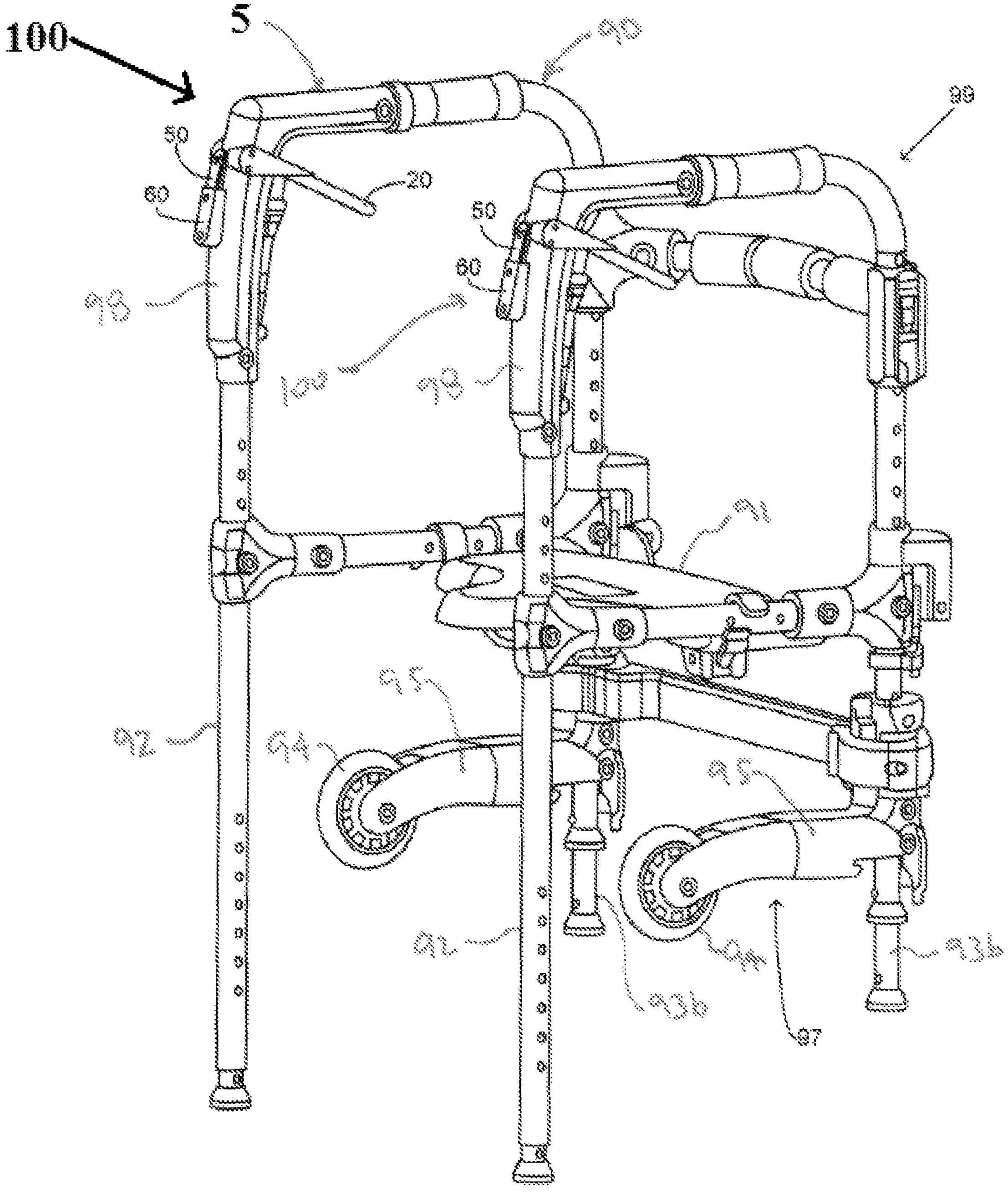
FIG. 3 is a perspective view of a mobility device in a second, wheels-up, stair-use configuration having the present invention operably mounted thereto, according to an embodiment.
Figure 4:
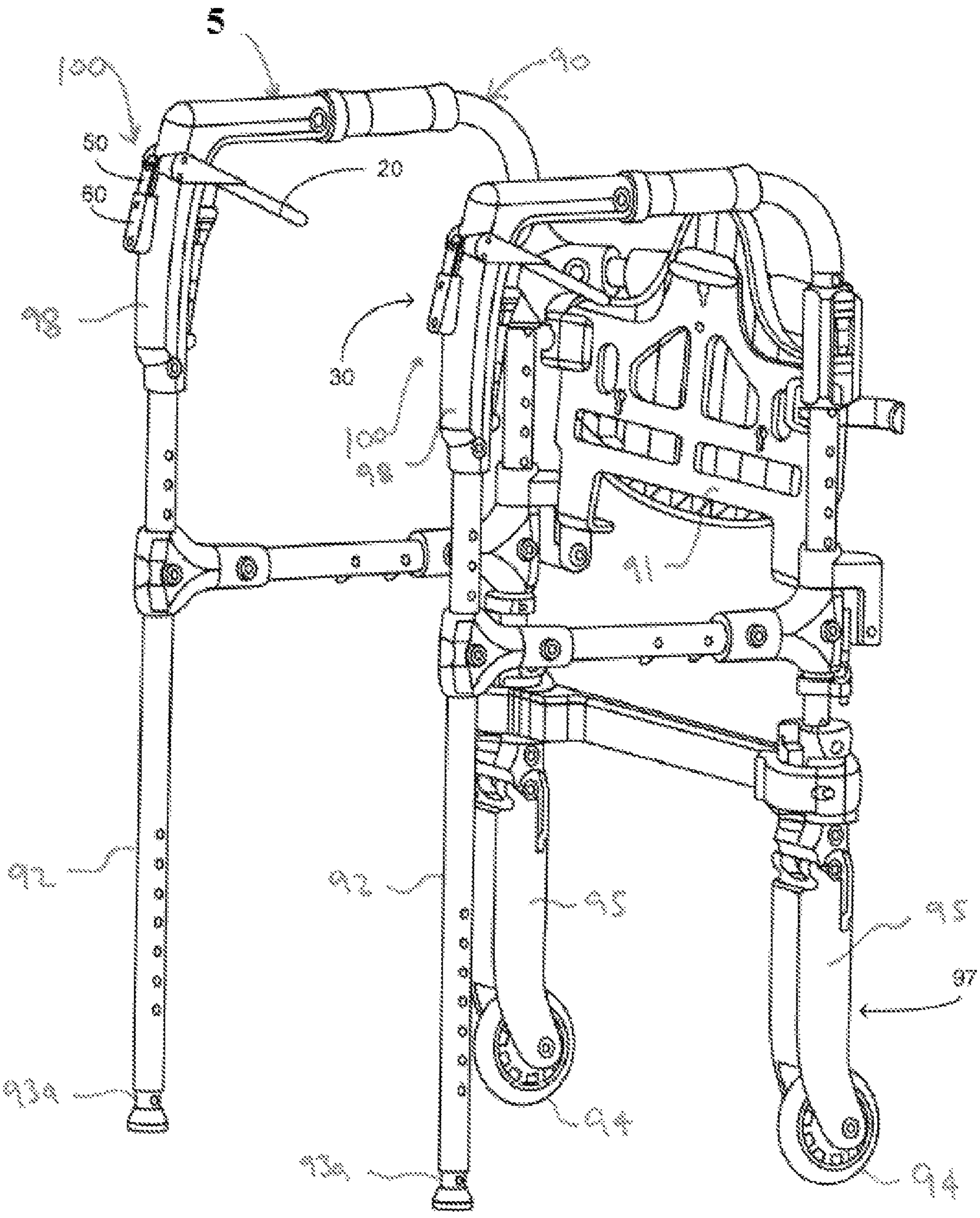
FIG. 4 is a perspective view of a mobility device in a first, wheels-down, flat-surface-use configuration having the present invention operably mounted thereto, according to an embodiment.

Referring in particular to the figures, and in particular, FIGS. 3 and 4, safety-control device 100 for a mobility device is mounted to an exemplary mobility device 99. In an embodiment, the mobility device 99 includes frame 90 and optional seat 91. The mobility device safety-control device 100 is mounted to, and may be integrated with, frame 90, as explained in further detail below. In the depicted embodiments, the mobility device 99 is depicted as having safety-control devices 100, but it will be understood that in other embodiments, a mobility device 99 may include only one safety-control device 100. In the case of only one safety-control device 100, safety-control device 100 may allow actuation of a pivoting wheel assembly 97 that includes two wheel-support members 95, as explained further below.

In an embodiment, frame 90 includes a pair of frame members 5 connected to corresponding frame members 98, pivoting wheel assembly 97, lower-rear frame members 92, rear legs 93*a* and front legs 93*b*. In the embodiment depicted, each frame member 5 extends in a generally horizontal direction, while each frame member 98 extends in a generally vertical direction. Wheel assembly 97 includes a pair of wheels 94 and a pair of wheel-support members 95. Legs 93, in an embodiment, and as depicted, may be telescoping legs that can be raised up and down to adjust a height of mobility device 99.

Mobility device 99 is configured to be transitioned between a first configuration (depicted in FIG. 4) and a second configuration (depicted in FIG. 3).

Referring specifically to FIG. 4, in this first configuration, mobility device 99 is configured primarily for use on a flat surface. The wheel assembly 97 is locked into a first, downward position such that the wheel-support members 95 extend in a generally vertical direction, bottom portions of wheels 94 are generally in the same horizontal plane as ends of rear telescoping legs 93*a*. The "horizontal plane" may be the surface on which the legs and wheels rest, e.g., the floor to be traversed.

Referring to FIG. 3 the exemplary mobility device is illustrated in in its second configuration. In this second configuration, mobility device 99 is configured primarily for stair use. Wheel assembly 97 is locked into a second, upward position, with wheels 94 moved into an upward, rearward position, displaced from the surface on which rear legs 93*a* rest upon. As depicted, wheel assembly 97 when moved into its second position, ends of front legs 93*b* are exposed. Front legs 93*b* are generally shorter than rear legs 93*b*, and do not extend vertically as far as rear legs 93*a*. As such, mobility device 99 is configured for use on stairs in this second configuration.

The exemplary mobility device 99 illustrated herein having the mobility device safety-control device 100 integrally as a part thereof is a walker but it should be understood that the mobility device safety-control device 100 could be integrally mounted to alternate mobility devices in order to provide control of the configuration thereof.

Figure 5:
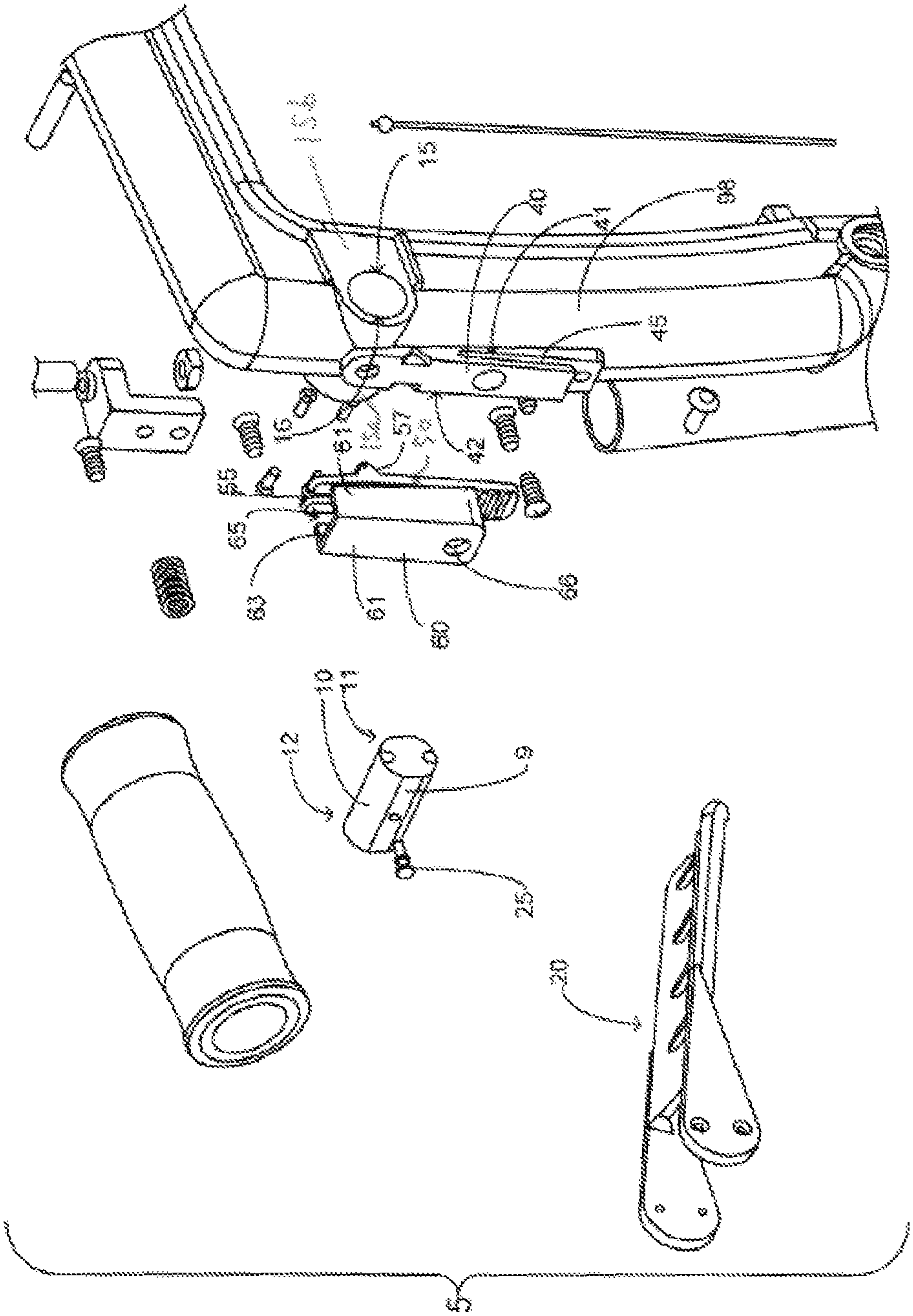
FIG. 5 is a detailed exploded view of the elements of the present invention, according to an embodiment.

Referring to FIG. 5, the mobility device safety control 100 includes a rotational member 10, which in an embodiment, and as depicted, may be generally cylindrical, and may include a flat surface on the outer cylindrical surface. Rotational member 10 may take other configurations and shapes, and is not intended to be restricted to a cylindrical or barrel shape as depicted. However, herein, and consistent with the embodiment depicted in the figures, rotational member 10 will be referred to as barrel member 10. Barrel member 10 is movably mounted within a rotational member receiving portion 15 which receives at least a portion of barrel member 10. Rotational member receiving portion 15 will herein be referred to as the barrel housing 15. The barrel member may be manufactured from a suitable durable material such as but not limited to metal or plastic. Barrel member 10 includes a first end 11 and a second end 12, wherein the first end 11 and second end 12 are proximate the perimeter edges 16 of the barrel housing 15.

In an embodiment, and as depicted, barrel housing 15 comprises first-side member 15*a* and second-side member 15*b* that mount to frame member 98. In an embodiment, first-side member 15*a* and second-side member 15*b* are positioned on opposite sides of frame member 98 and are attached to frame member 98 in a clamping manner. Each member 15*a*, 15*b* defines a through hole configured to receive barrel member 10. In an embodiment, the section of frame member 98 to which barrel housing 15 is connected defines a first through hole adjacent first-side member 15*a* and aligned with the through hole of first-side member 15*a*. In such an embodiment, frame member 98 defines a second through hole adjacent second-side member 15*b* and aligned with the through hole of second-side member 15*a*. As such, frame member 98 and barrel housing 15 (and its members 15*a* and 15*b*) are configured to receive generally-cylindrical barrel member 10, and to allow selective rotation of barrel member 10 within frame member 98 and barrel housing 15.

Figure 2:
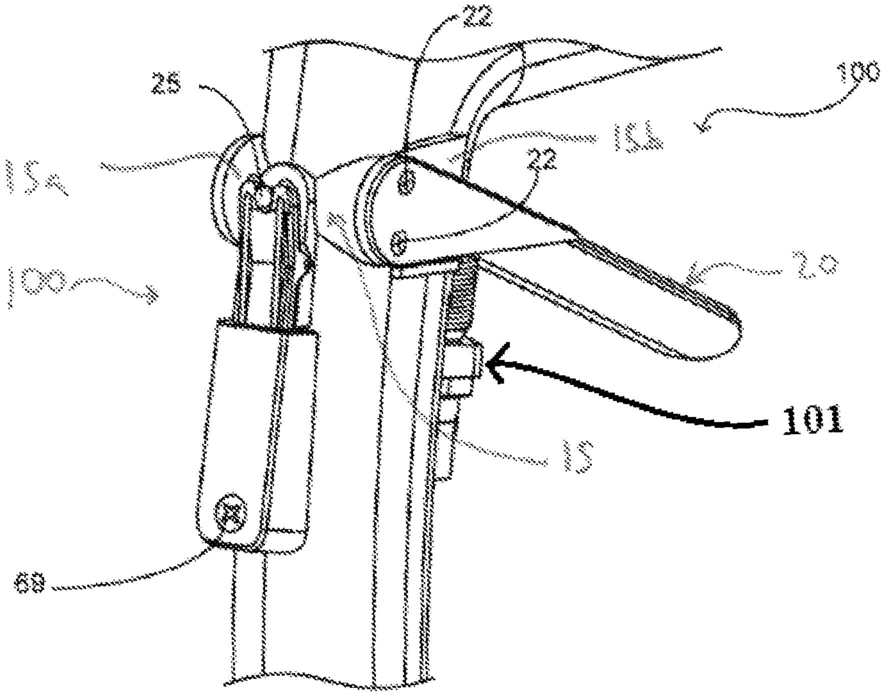
FIG. 2 is a detailed view of the present invention mounted to a mobility device, according to an embodiment.

Referring also to FIGS. 1-2 lever handle 20 is operably coupled to the barrel member 10 so as to provide rotational operation thereof. Lever handle 20 is secured to the barrel member 10 utilizing fasteners 22 so as to provide movement of the barrel member 10 upon the lever handle being moved from its first position (as depicted in FIGS. 1-2) to it second position (not depicted) wherein in its second position the lever handle 20 is adjacent the bottom surface 4 of frame member 5, as indicated by the double-headed arrow in FIG. 1. Barrel member 10 includes a locking pin 25 that is operably coupled thereto. Locking pin 25 is mounted to the front surface 9 of the barrel member 10 and is perpendicular thereto and extends outward therefrom (see also, FIG. 5).

The safety clip assembly 30 is secured to frame member 98 wherein the safety clip assembly 30 functions to provide a technique that inhibits a user of the exemplary mobility device 99 from transitioning intermediate its first configuration (wheel assembly 97 down/flat-surface use) and second configuration (wheel assembly 97 up/stair use) wherein the aforementioned is achieved through inhibiting movement of the barrel member 10. In an embodiment, the mobility device safety control 100 is utilized by a practitioner that is assisting a patient using the mobility device safety control 100 wherein the practitioner utilizes the safety clip assembly 30 so as to permit a patient to transition mobility device 99 between the first configuration and the second configuration of the exemplary mobility device 99. Lever 20 and barrel member 10 are operably coupled to the wheel assembly 97. As is illustrated herein in FIGS. 3 and 4, exemplary mobility device 99 includes a wheel assembly 97 that is movable so as to allow the exemplary mobility device to be utilized on a flat surface or on stairs. In FIG. 3, the exemplary mobility device depicts the wheel assembly 97 moved to its second position wherein the wheel-support members are positioned so as to assist a user to traverse stairs. FIG. 4 illustrates the exemplary mobility device 99 wherein wheel assembly 97 is in position so as to assist a user in traversing a flat surface. Referring also to FIG. 2, actuation assembly 101 is connected to lever 20 and wheel assembly 97, linking lever 20 and wheel assembly 97 so that movement of lever 20 moves wheel assembly 97. In an embodiment, actuation assembly 101 includes a biasing member, such as a spring, an adjustment member, such as a hollow threaded member with a corresponding adjusting nut, and a cable.

Referring to FIGS. 1 and 5, safety clip assembly 30 includes a clip member base 40 that is mounted to frame member 98. Clip member base 40 is elongated in form and includes a first side 41 and a second side 42. Formed in the first side 41 and second side 42 are slots 45 (not illustrated herein for second side 42). Hingedly secured to the clip member base 40 is clip member 50. Clip member 50 is hingedly secured to the clip base member 40 utilizing pin 52 wherein pin 52 is secured to mounting tabs 57 that are contiguously formed with the clip member 50. The clip member 50 includes a first portion 53 and second portion 54 that in an embodiment, and as depicted, are contiguously formed. Second portion 54 is angularly oriented with respect to first portion 53. Second portion 54 of clip member 50 includes slot 55. Slot 55 is configured to operably coupled with locking pin 25. Clip member 50 is biasly mounted so as to move intermediate a first position and a second position. In its first position, as depicted in FIGS. 1 and 2, the clip member 50 is positioned such that the slot 55 is operably coupled with the locking pin 25. In this first position the barrel member 10 and connected lever 20, are inhibited from movement, and as such, the exemplary mobility device 99 cannot be transitioned between its first configuration and second configuration. In its second position the clip member 50 the second portion 54 is hinged away from the locking pin 25 and as such lever handle 20 facilitates the movement of the barrel member 10 as locking pin 25 is disengaged from slot 55. This allows a user to transition the exemplary mobility device from its first configuration to its second configuration. Safety clip assembly 30 is positioned on frame member 98 so as to allow access thereto from a practitioner that is assisting a patient utilizing the exemplary mobility device 99 for physical therapy or other similar tasks. It should be understood within the scope of the present invention that the safety clip assembly 30 could be mounted in alternate locations for alternate mobility devices.

A clip member guard 60 is slidably secured to clip member base 40. Clip member guard 60 includes three walls 61, 62, 63 that are contiguously formed so as to define void 65. Clip member guard 60 is configured to be slidable intermediate a first position and a second position wherein in its second position the clip member guard 60 inhibits access to clip member 50. Clip member guard 60 is configured to cover at least a portion of first portion 53 of clip member 50. When th clip member guard 60 is positioned so as to be superposed first portion 53 of clip member 50, a user is unable to depress first portion 53 and as such transition clip member 50 to a position that allows barrel member 10 to rotatably move. This inhibits the ability for a user of the exemplary mobility device 99 to transition exemplary mobility device 99 intermediate its first configuration and its second configuration. Clip member guard 60 includes aperture 66 formed in wall 62 wherein aperture 66 is operable to receive therein fastener 69. Fastener 69 is utilized to ensure maintenance of clip guard member 60 in its second position so as to inhibit operation of clip member 50. It should be understood within the scope of the present invention that fastener 69 could be various types of mechanical fasteners that are operable to achieve the desired objective discussed herein. Clip member guard 60 provides an element that can be secured by a practitioner wherein it is the practitioner's objective to inhibit a patient utilizing the exemplary mobility device 99 from being able to transition the exemplary mobility device 99 from its first configuration to its second configuration while not in the presence of the practitioner. While an embodiment of the mobility device safety control 100 has been illustrated herein being operably coupled to the mobility device safety control 100 that is a walker, it should be understood within the scope of the present invention that the mobility device safety-control device 100 could be employed on alternate types of mobility devices so as to inhibit transition between a first configuration to a second configuration.

FIGS. 6-29 depict another embodiment of a mobility device with a safety-control device similar to mobility device 99 with safety-control device 100 as described above. In FIGS. 6-29, embodiments of mobility device 199 and safety-control device 200 are depicted.

Mobility device 199 is substantially similar to mobility device 99, with an exception that mobility device 199 includes safety-control device 200, instead of safety-control device 100. Further, mobility device 199 includes only a single safety-control device 200 as depicted, though it will be understood that either mobility device 99 or mobility device 199 could include one or two safety-control devices. In the embodiment of mobility device 199, a patient or practitioner need only operate the one mobility safety control 200 and lever handle to change the position of the pivoting wheel assembly, as described further below. Such a configuration makes it easier for the practitioner to configure mobility device 199.

Further, although mobility safety control 200 is depicted on a right side of mobility device 199, it will be understood that safety control 200 may be located elsewhere on mobility device 199, including at a left-side of mobility device 199.

It will also be understood that the embodiment of safety-control device 200 may be used with mobility device 199 or 99, and control device 100 may be used with mobility device 99 or 199.

Figure 6:
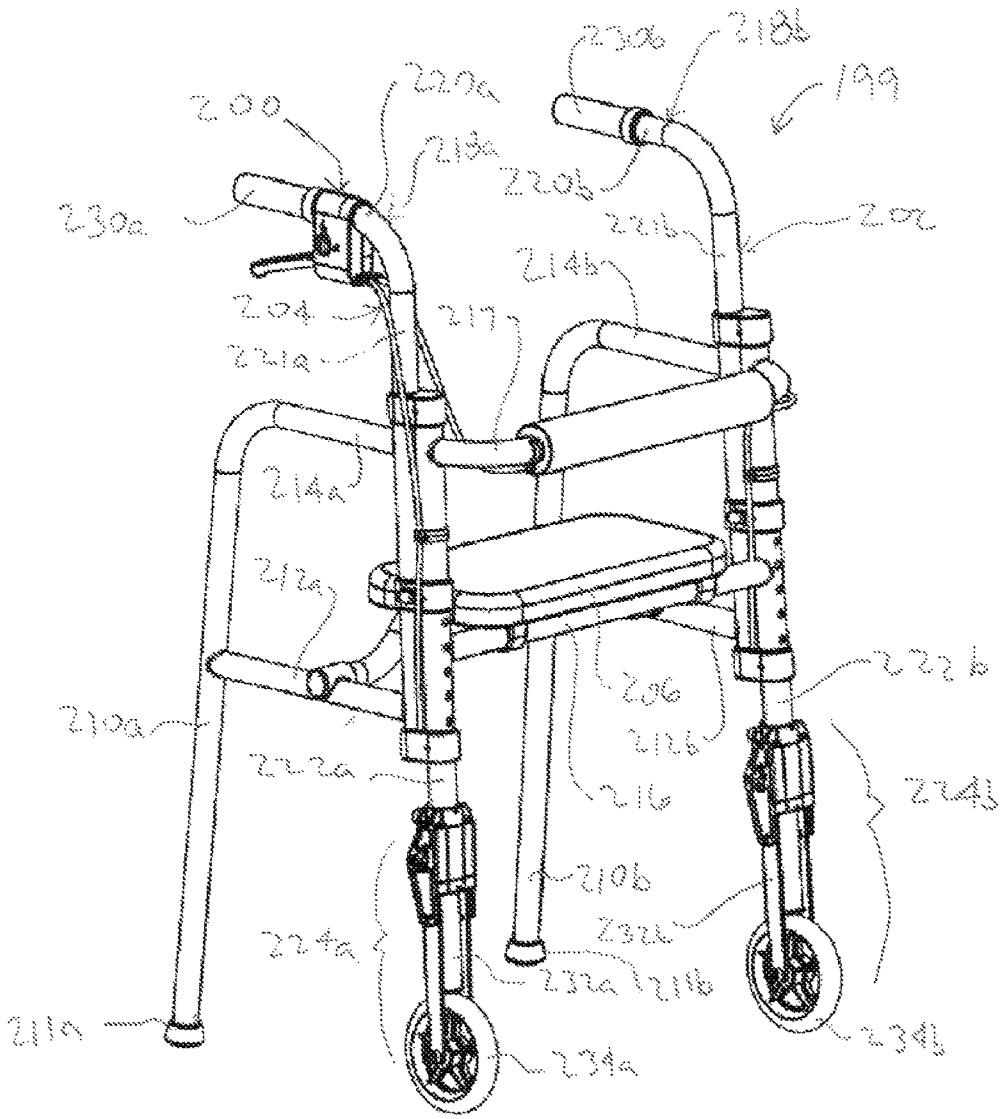
FIG. 6 is a perspective view of a mobility device with a safety-control device, in a first, wheels-down, flat-surface-use configuration, according to an embodiment.
Figure 7:
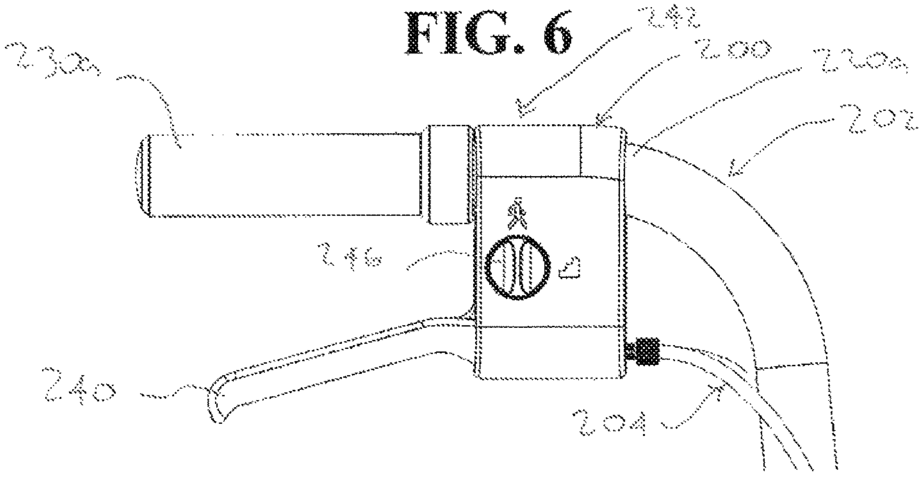
FIG. 7 is a right-side elevation view of the safety-control device of FIG. 6, in the first configuration.
Figure 8:
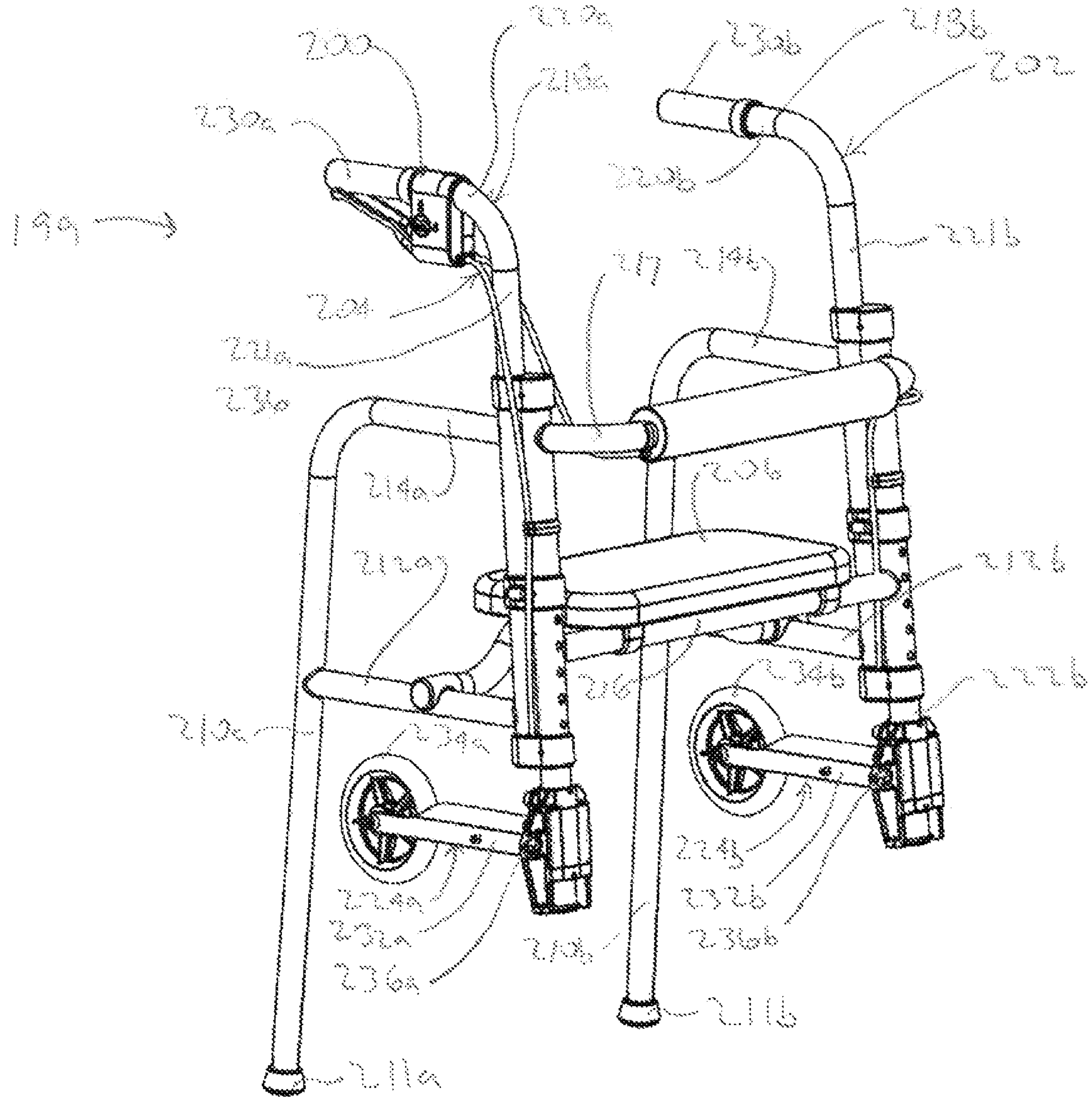
FIG. 8 is a perspective view of a mobility device with a safety-control device, in a second configuration, according to an embodiment.
Figure 9:
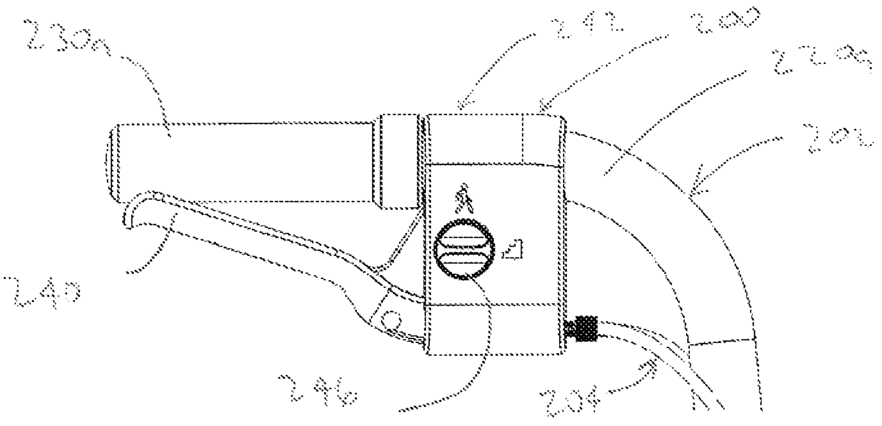
FIG. 9 is a right-side elevation view of the safety-control device of FIGS. 8, in the second configuration.

As will be described further below, FIGS. 6-7 depicts mobility device 199 with safety-control device 200 in a first configuration, including lever 240 being in a first lever position and configuration selector 246 being in a first configuration-selector position, the first configuration being a wheels-down configuration, and the first configuration intended primarily for use on a horizontal, generally flat surface. FIGS. 8-9 depicts mobility device 199 in a second, wheels-up, configuration, including lever 240 being in a second lever position and configuration selector 246 being in a second configuration-selector position, the second configuration intended primarily for use on stairs.

Referring to FIGS. 6 and 8, mobility device 199 with safety-control device 200 is depicted. Similar to mobility device 99, in addition to one or more safety-control devices 200, mobility device 199 includes frame 202, leg-actuation system 204 and optional seat 206.

In an embodiment, and as depicted, frame 202 includes: rear frame members or legs 210, which include first rear frame member 210*a* with end 211*a* and second rear frame member 210*b* with end 211*b*; lower horizontal frame members 212, which includes first lower horizontal frame member 212*a* and second lower horizontal frame member 212*b*; upper horizontal frame members 214, which include first upper horizontal frame member 214*a* and second upper horizontal frame member 214*b*; lower cross member 216; upper cross member 217; first frame handle member 218*a* with first horizontal grasping portion 220*a* and first vertical portion 221*a*; second fame handle member 218*b* with second horizontal grasping portion 220*b* and second vertical portion 221*b*; front frame members or legs 222, including first front frame member 222*a* and second front frame member 222*b*; and movable leg portions 224, which in an embodiment are pivoting leg portions 224, and further may comprise pivoting wheel assemblies, include first pivoting wheel assembly 224*a* and second pivoting wheel assembly 224*b*. Hereinafter, movable leg portions 224 will be referred to as pivoting wheel assemblies 224, though it will be understood that in other embodiments, movable leg portions 224 may not include wheels, or may move in a motion that is not a pivoting motion.

The various frame members and assemblies are joined together as depicted, with rear frame members 210 extending in a generally vertically direction, and connected to their respective lower and upper horizontal frame members 212 and 214, respectively. Lower and upper horizontal frame members 212 and 214 are connected to their respective front frame members 222. Front frame members 222 extend generally vertically and are connected to pivoting wheel assemblies 224.

Front frame members 222 are connected to, or integral with, vertical portions 221 of frame handle members 220.

Lower cross member 216 extends horizontally between vertical portions 221 or front frame members 222 and supports seat 206. Upper cross member 218 extends horizontally between vertical portions 221, at a position above, or higher than, lower cross member 216.

First horizontal grasping portion 220*a* extends generally horizontally, and may include grip portion 230*a*. First horizontal grasping portion 220*a* is connected to first vertical portion 221*a*, which extends generally vertically. Safety-control device 200, in an embodiment, is attached or connected to first horizontal grasping portion 220*a*, though as mentioned briefly above, safety-control device 200, in another embodiment, is attached to second horizontal grasping portion 220*b*.

Second horizontal grasping portion 220*b* extends generally horizontally, and may include grip portion 230*b*. Second horizontal grasping portion 220*b* is connected to second vertical portion 221*b*, which extends generally vertically.

Seat 206, in an embodiment, is pivotable about lower cross member 216, so that a user may move seat 206 to a position that is convenient for the user, or that is amenable to folding and/or storing mobility device 199.

Movable leg portions 224, which in an embodiment include pivoting wheel assemblies 224, include wheel-support members 232 that support wheels 234. Pivoting wheel assembly 224*a* includes wheel-support member 232*a* supporting wheel 234*a* and pivoting wheel assembly 224*b* includes wheel-support member 232*b* supporting wheel 234*a*.

As will be described further below, lever 240 of safety-control device 200 may be actuated or moved from a first lever position to a second lever position to unlock pivoting wheel assemblies 224 via leg-actuation system 204, allowing pivoting wheel assemblies 224 to be moved to a wheels-up position via spring force. Mobility devices with pivoting-wheel mechanisms are generally known in the art, as exemplified by U.S. Pat. No. 10,278,884, issued May 7, 2019, and entitled "Ambulatory Assistance Apparatus Adaptable for a Staircase," which is incorporated herein by reference in its entireties.

Referring to FIGS. 6 and 7, mobility device 199 and safety-control device 200 are depicted in a first configuration, which is a wheels-down, walk configuration. In this configuration, first and second wheel support members 232*a* and 232*b* of pivoting wheel assemblies 224*a* and 224*b*, respectively, extend in a generally vertical direction, aligned with first and second front frame members 222*a* and 222*b*, respectively, i.e., are in a first leg position. Pivoting wheel assemblies 224*a* and 224*b* are locked in this position, and cannot be unlocked and moved into the second, wheels-up configuration without operating safety-control device 200, as will be described further below.

Referring specifically to FIG. 7, safety-control device 200 is depicted as mounted to first horizontal grasping portion 202*a* of frame 202 and connected to leg-actuation system 204.

Figure 10:
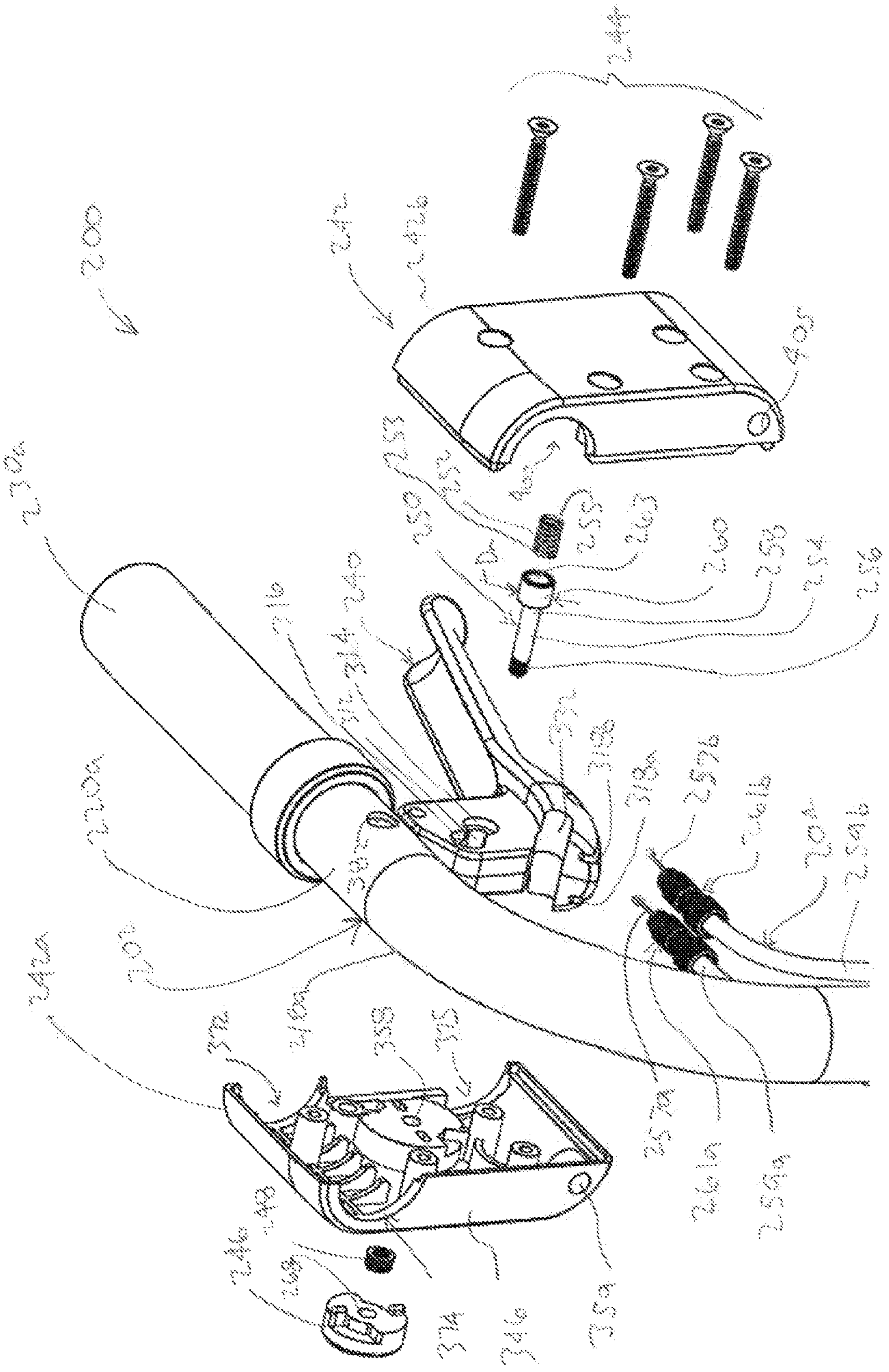
FIG. 10 is an exploded view of the safety-control device of FIGS. 7 and 9.
Figure 11:
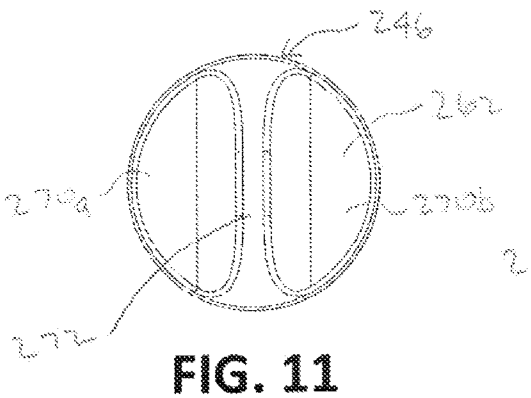
FIG. 11 is a front elevation view of a configuration selector of a safety-control device, according to an embodiment.

Referring also to FIG. 10, an exploded view of safety-control device 200 is depicted. In an embodiment, safety-control device 200 includes lever 240, housing 242, which includes first housing portion 242*a* and second housing portion 242*b*, multiple fasteners 244, configuration selector 246 (also referred to as actuator knob, button, switch or dial), threaded insert 248, lever-lock rod 250 (also referred to as "rod" 250) and spring 252.

Rod 250 includes shaft 254 with first end 256 second end 258, and head 260. In an embodiment, first end 256 of shaft may be threaded, as depicted, though in other embodiments, and depending on the particular connection to configuration selector 246, first end 254 of rod may be free of threads.

Head 260 is positioned at second end 258 of shaft 254, and in an embodiment, defines spring-receiving cavity 263, configured to receive second end 255 of spring 252. Head 260 defines an outside diameter Dh.

Spring 252 comprises first end 253 and second end 255.

Leg-actuation system 204 is also depicted, and in an embodiment, includes a pair of cables 257, which includes first cable 257*a* and second cable 257*b*, cable housings 259, which includes first cable housing 259*a* housing first cable 257*a*, and second cable housing 259*b* housing second cable 257*b*. Leg-actuation system 204 may also include a pair of cable-housing fastener sets 261, including fastener set 261*a* and second fastener set 261*b*.

Referring to FIGS. 11-16, multiple view of configuration selector 246, which in an embodiment comprises a knob, are depicted. In an embodiment, and as depicted, configuration selector 246 may define a generally round shape, and includes front side 262, rear side 264 and perimeter surface 266. Configuration selector 246 defines hole 268, which in an embodiment, is a blind hole, configured to receive threaded insert 248 and first end 256 of shaft 254 of rod 250. Configuration selector 246 defines a central configuration-selector axis Acs. In an embodiment, configuration selector 246 is rotatable about this axis, between a first configuration-selector position and a second configuration-selector position.

Front side 262 of configuration selector 246, in an embodiment, includes first flat surface 270*a*, second flat surface 270*b*, with raised portion 272 therebetween. Raised portion 272 extends generally upward and away from surfaces 270*a* and 270*b* such that a user may easily grasp or otherwise contact configuration selector 246 so as to turn configuration selector 246.

Rear side 264 includes rear surface 276, first recessed surface 278*a*, second recessed surface 278*b*, first wall 280*a*, second wall 280*b*, first projection 282*a* and second projection 282*b*. Rear side 264 of configuration selector 246 defines first housing-stop recess 284*a* and second housing-stop recess 284*b*.

Rear surface 276 may be substantially flat, forming a planar surface. First recessed surface 278*a* and second recessed surface 278*b* may also be substantially flat.

First wall 280*a* includes first wall-end portion 286*a* with first wall-end surface 287*a*, second wall-end portion 286*b* with second wall-end surface 287*b*, and intermediate portion 288. First wall 280*a* extends vertically upward and away from first recessed surface 278*a*. First wall 280*a* in combination with first recessed surface 278*a* define first housing-stop recess 284*a*, which is configured to receive a portion of first housing portion 242*a*, as described further below.

Second wall 280*b* includes first wall-end portion 290*a* with first wall-end surface 291*a*, second wall-end portion 290*b* with second wall-end surface 291*b*, and intermediate portion 292. Second wall 280*b* extends vertically upward and away from second recessed surface 278*b*. First wall 280*b* in combination with second recessed surface 278*b* define second housing-stop recess 284*a*, which is configured to receive a portion of first housing portion 242*a*, as described further below.

First projection 282*a* projects upward and away from rear surface 276 and is located adjacent to first wall-end portion 286*a*. In an embodiment, a side surface of first projection 282*a* is continuous with first wall-end surface 287*a*.

Second projection 282*b* projects upward and away from rear surface 276 and is located opposite to first projection 282*a*, adjacent to first wall-end portion 290*a*. In an embodiment, a side surface of second projection 282*b* is continuous with second wall-end surface 291*b*.

Figure 17:
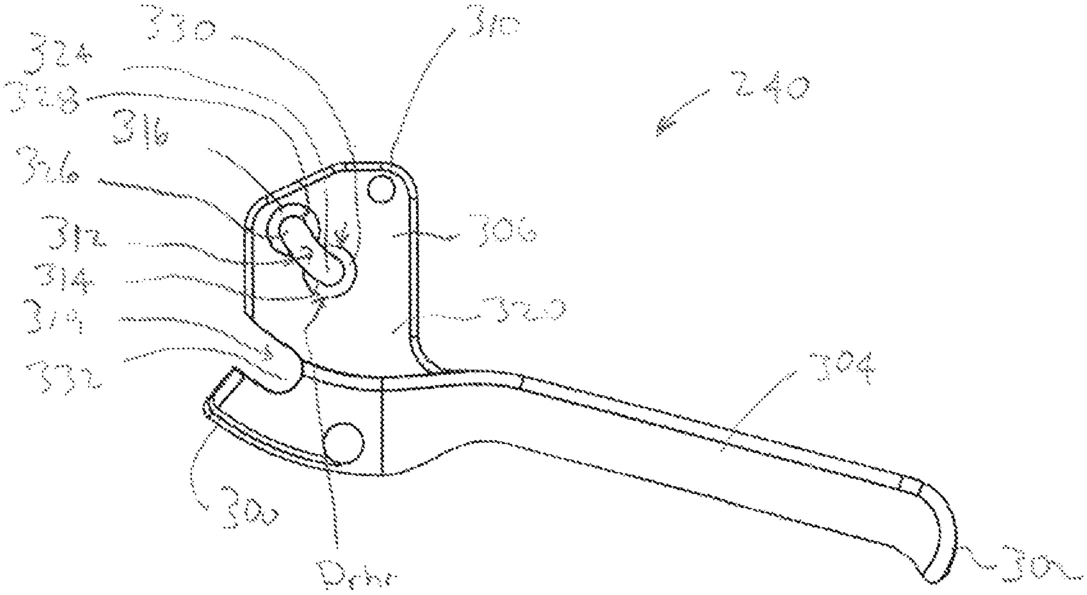
FIG. 17 is a left-side elevation view of a lever of a safety-control device, according to an embodiment.
Figure 18:
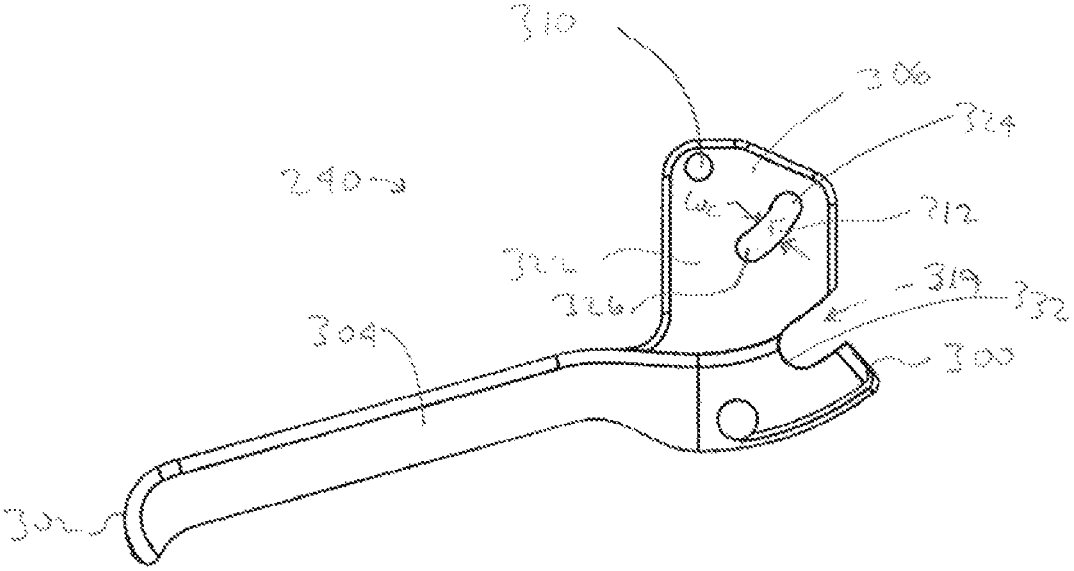
FIG. 18 is a right-side elevation view of the lever of FIG. 17.
Figure 20:
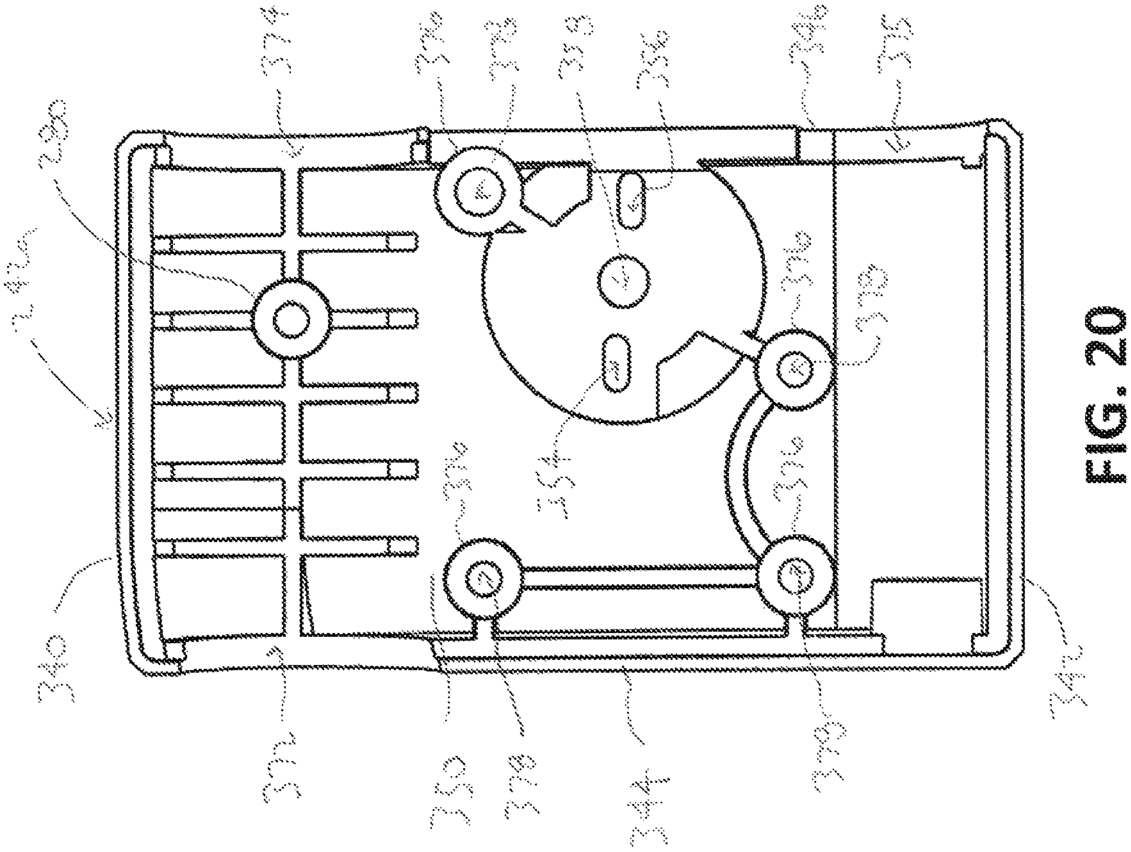
FIG. 20 is a rear elevation view of the first housing portion of FIG. 19.

Referring to FIGS. 10, 17 and 18, lever 240 of safety-control device 200 is depicted. In an embodiment, lever 240 includes first end 300, second end 302, lever arm 304 and base portion 306. Lever 240 defines pivot hole 310, shaft-receiving channel 312 for receiving shaft 254 of rod 250 (see also FIG. 10), first rod-head-receiving recess 314, second rod-head-receiving recess 316, first cable-receiving opening 318*a*, second cable-receiving opening 318*b*, and channel 319.

Lever arm 304 is connected to, and may be integral with, base portion 306, and is configured to be grasped by a user.

Base portion 306 includes first side 320 and second side 322, each of which may be substantially flat or planar. Pivot hole 310 extends through base portion 306 from first side 320 to second side 322, and may be circular as depicted. Shaft-receiving channel 312 extends through base portion 306 from first side 320 through to second side 322. In an embodiment, and as depicted, shaft-receiving channel 312 is curved, or arcuate, and includes first end 324 and second end 326. Shaft-receiving channel 312 defines a width Wc, which in an embodiment is constant from first end 324 to second end 326.

First rod-head recess 314 and second rod head recess 316 are countersunk into and defined by, first side 320 of lever 240, each defining diameter Drhr. In an embodiment, diameters Drhr are slightly larger than diameter Dh of rod head 260, so that rod head 260 may fit into either of rod-head-receiving recesses 314 and 316. First rod-head recess 314 is at first end 324 of shaft-receiving channel 312 and second rod-head recess 316 is at second end 326 of shaft-receiving channel 312. Base portion 306 also includes first recess surface 328 and second recess surface 330, each of which, as described later, abut a portion of rod head 260.

First rod-head recess 314 and second rod head recess 316 each define an inside diameter that is greater than width Wc of channel 312.

Channel 319 is between, and defined by, base portion 306 and first end 300, and may be curved or arcuate as depicted. Channel 319 is also defined by channel surface 332 which comprises a portion of base portion 306 and first end 300.

Referring to FIGS. 10 and 19-22, an embodiment of first housing portion 242*a* is depicted. First housing portion 242*a* includes top end 340, bottom end 342, left side 344, right side 346, front side 348 and rear side 350.

Referring specifically to FIGS. 10, 19 and 21-22, first housing portion 242*a* defines configuration-selector recess 352 in front side 348, first projection receiving hole 354, second projection receiving hole 356, central aperture or hole 358, and cable-receiving hole 359. In an embodiment, first projection receiving hole 354, second projection receiving hole 356, central aperture or hole 358, and cable-receiving hole 359 may be through holes, as depicted. In another embodiment, first projection receiving hole 354 and second projection receiving hole 356 are blind holes.

Front side 348 includes outer surface 360, recessed surface 362, first raised limiter portion 364 and second raised limiter portion 366. Recessed surface 362 is within recess 352, and in an embodiment is a flat, planar surface.

First raised limiter portion 364 and second raised limiter portion 366 generally project upward and away from recessed surface 362, and in an embodiment, are curved or have an arcuate shape. First raised limiter portion 364 includes top surface 368 and second raised limiter portion 366 includes top surface 370. In an embodiment, each top surface 368 and 370 lie below outer surface 360, meaning not level or in the same plane as outer surface 360, or recessed from outer surface 360. First raised limiter portion 364 also includes side wall 369 and second raised limiter portion 366 includes side wall 371.

Referring specifically to FIGS. 10 and 20-22, left side 344 of first housing portion 242*a* defines first handle-receiving recess 372, right side 346 defines second handle-receiving recess 374, and lever-receiving recess 375.

First housing portion 242*a* also includes a plurality of fastener-receiving portions 376, including fastener-receiving portions 376*a*, 376*b*, 376*c* and 376*d*, for receiving ends of fasteners 244. In an embodiment, fastener-receiving portions 376 comprises cylindrical posts projecting outward and away from rear side 350. In an embodiment, and as depicted, first housing portion 242*a* includes four fastener-receiving portions 376, though more or fewer fastener-receiving portions 376 may be present, depending on the desired number of connection points between first housing portion 242*a* and second housing portion 242*b*. Each fastener-receiving portion 376 defines a fastener-receiving hole 378.

First housing portion 242*a* may also include handle-insertion portion 380 which projects outwardly and away from rear side 350 near top end 340. Handle-insertion portion 380 is configured to be inserted into an opening in handle member 218*a*, opposite opening 382 depicted in FIG. 10, so as to couple with frame 202, as described further below.

Front side 348 may include one or more icons to indicate and define a mobility device 199 configuration, such as first icon 384 indicating a first wheels-down, walk configuration, and second icon 386 indicating a second, wheels-up, stair-climb configuration.

Referring to FIGS. 10 and 21-24, an embodiment of second housing portion 242*b* is depicted. Second housing portion 242*b* includes top end 388, bottom end 390, left side 392, right side 394, front side 396 and rear side 390.

Left side 392 of second housing portion 242*b* defines first curved handle-receiving recess 400, right side 394 defines second curved handle-receiving recess 402, lever-receiving recess 404, and cable-receiving hole 405.

Second housing portion 242*b* also includes a plurality of fastener-receiving portions 406, including fastener-receiving portion 406*a*, fastener-receiving portion 406*b*, fastener-receiving portion 406*c* and fastener-receiving portion 406*d*, for receiving fasteners 244. In an embodiment, fastener-receiving portions 406 comprise cylindrical posts projecting outward and away from rear side 398. In an embodiment, and as depicted, second housing portion 242*b* includes four fastener-receiving portions 406, though more or fewer fastener-receiving portions 406 may be present, depending on the desired number of connection points between first housing portion 242*a* and second housing portion 242*b*. Each fastener-receiving portion 406 defines a fastener-receiving hole 408. When assembled to first housing portion 242*a*, fastener-receiving portions 406 align with fastener-receiving portions 376 of first housing portion 242*a* to form continuous structures.

First housing portion 242*a* may also include handle-insertion portion 410 which projects outwardly and away from rear side 350 near top end 340. Handle-insertion portion 410 is configured to be inserted into an opening in handle member 218*a*, opposite opening 382 depicted in FIG. 10, so as to couple with frame 202, as described further below.

In an embodiment, second housing portion 242*b* includes spring-end receiving portion 420 that defines opening 422. In an embodiment, spring-end receiving portion 420 comprises a cylindrical structure that extends outwardly and aware from rear side 398. In other embodiments, spring-end receiving portion 420 may comprise other shapes and structures that function to retain or affix second end 255 of spring 252. Opening 422, in an embodiment, defines a blind hole.

Figure 21:
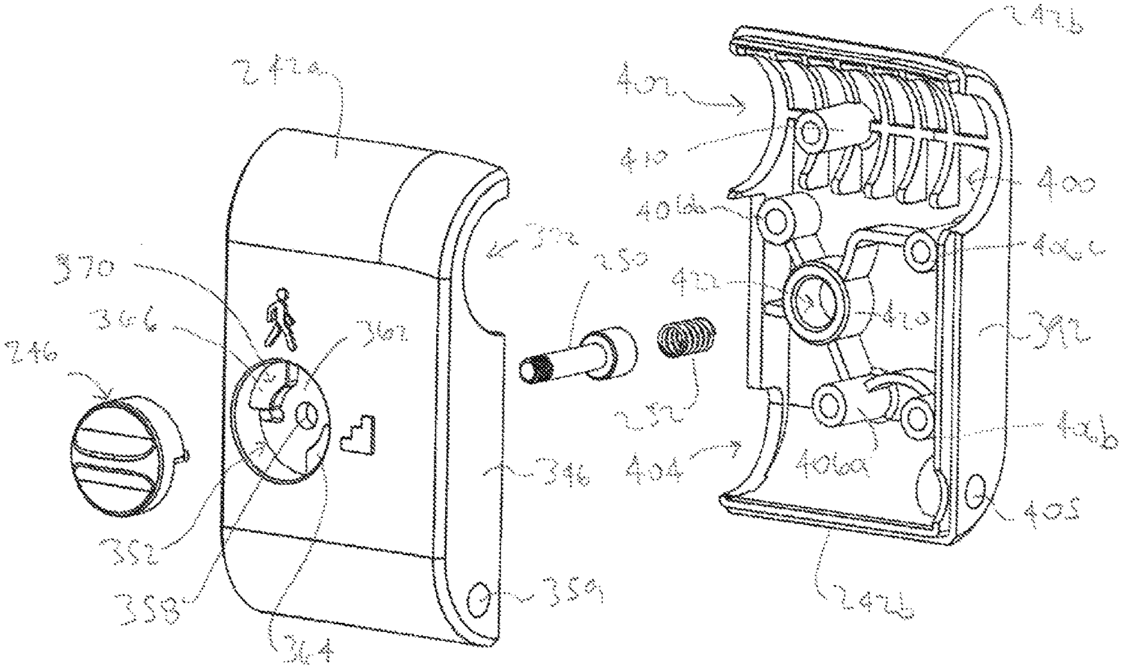
FIG. 21 is an exploded view of selected components of a safety-control device.
Figure 22:
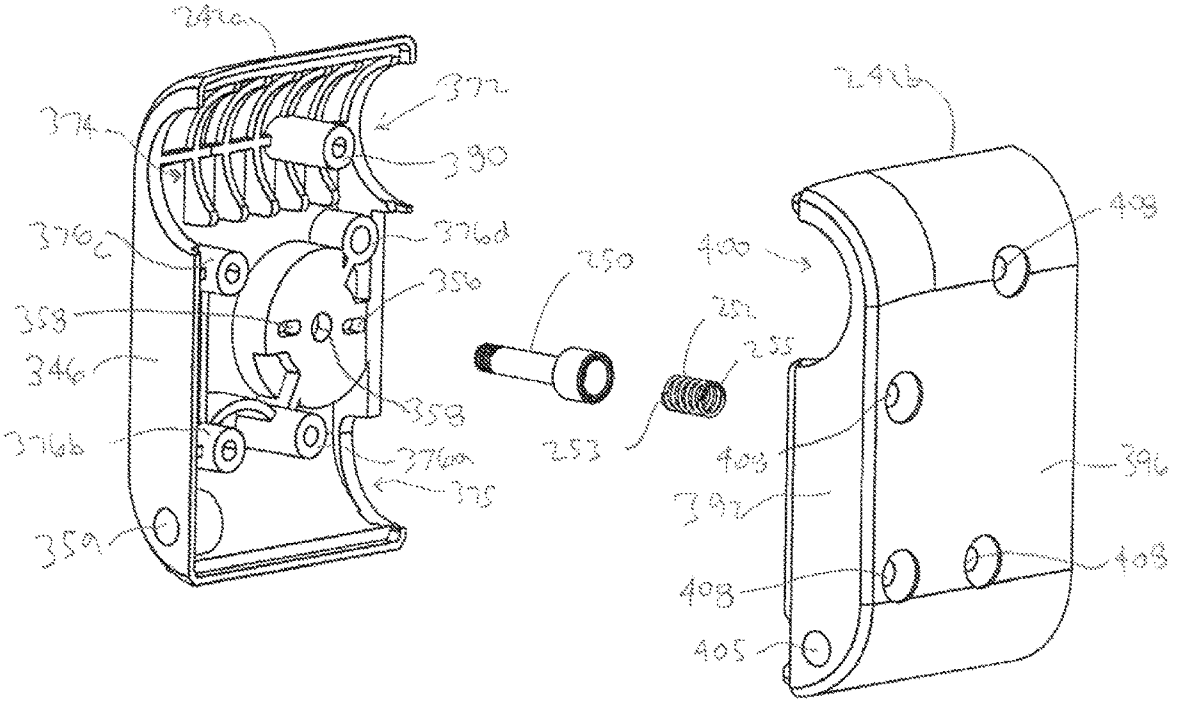
FIG. 22 is another exploded view of the selected components of FIG. 21.
Figure 24:
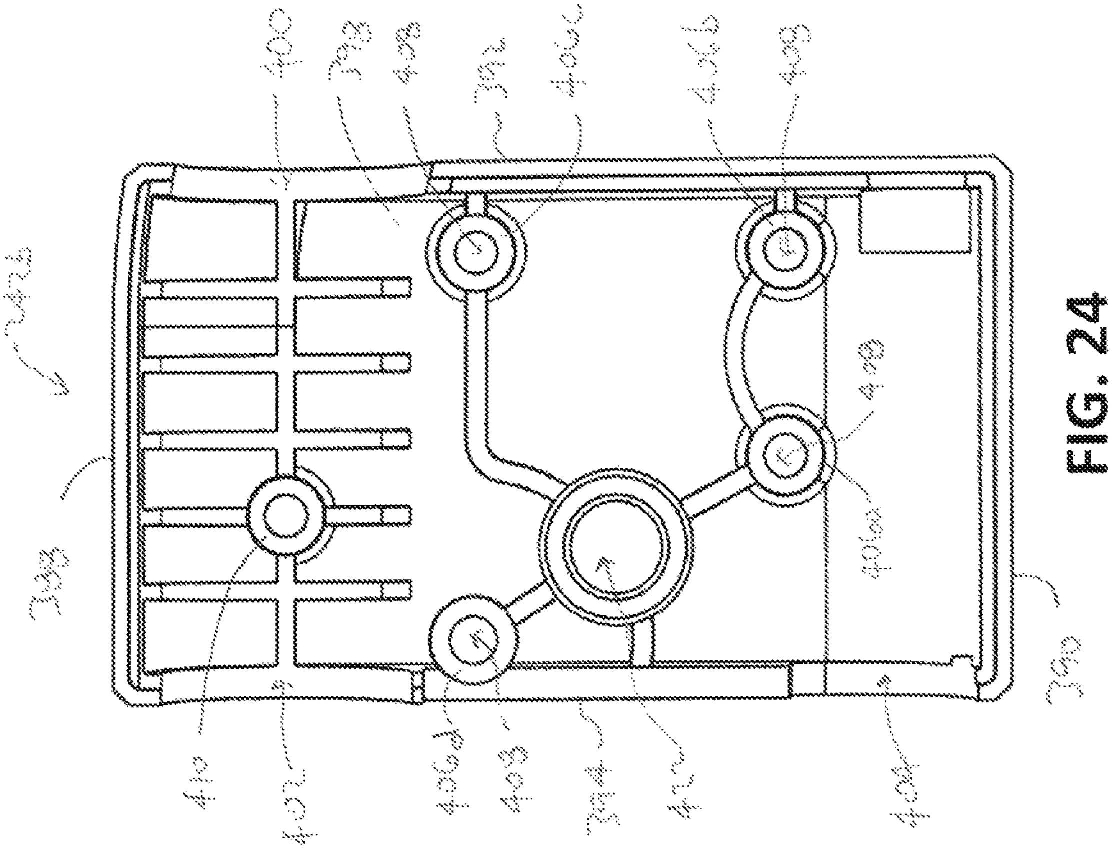
FIG. 24 is a rear elevation view of the second housing portion of FIG. 23.
Figure 23:
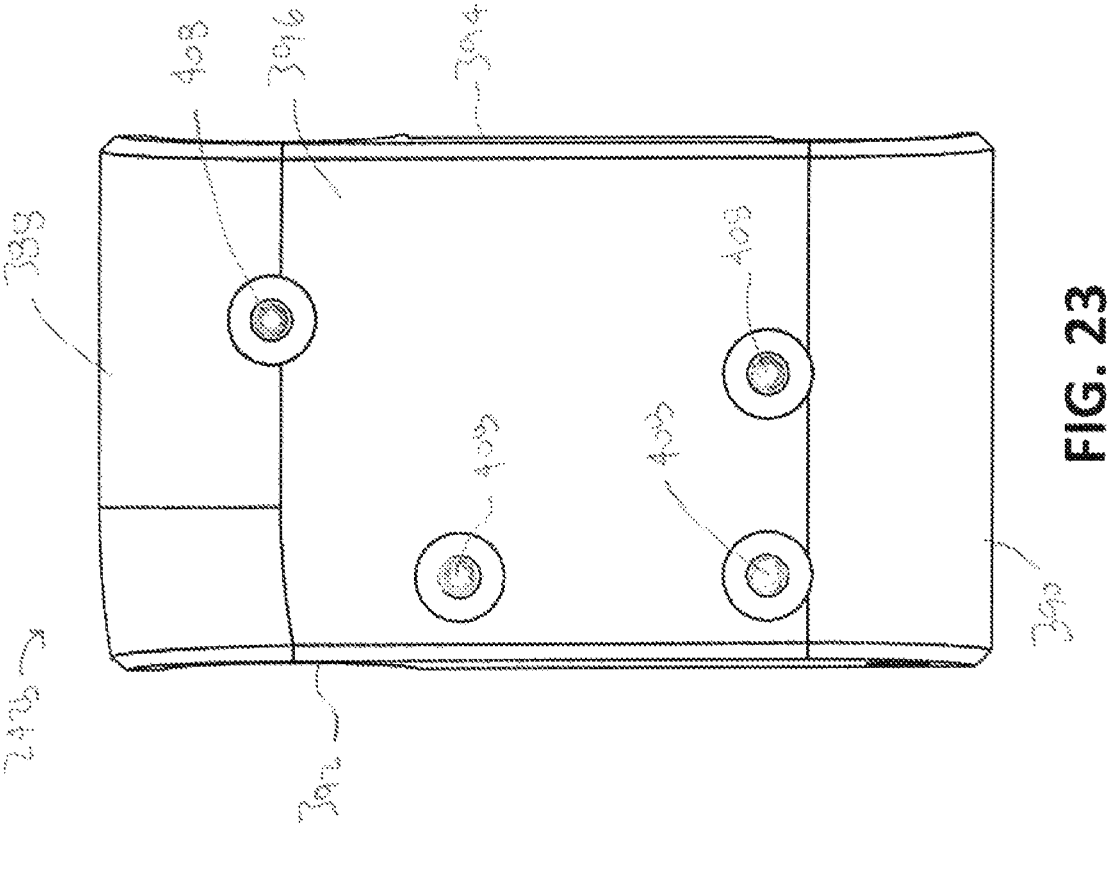
FIG. 23 is a front elevation view of a second housing portion of a safety-control device, according to an embodiment.

Referring to FIGS. 10, 21 and 22, when safety-control device 200 is assembled onto frame 202, insert 248 (when used) is received into hole 268 of configuration selector 246, and configuration selector 246 is received into recess 352 such that surface 276 (see also FIG. 12) of configuration selector 246 contacts, or is close to, recessed surface 362 of first housing portion 242*a*. First housing assembly 242*a* is adjacent to and abutting first horizontal grasping portion 220*a* of handle portion 218*a*, such that handle insertion portion 380 is inserted into an opening in first horizontal grasping portion 220*a*, and first horizontal grasping portion 220*a* is received into first and second handle receiving recesses 372 and 376.

Cables 257*a* and 257*b* are located in first and second cable-receiving openings 318*a* and 318*b* of lever 240, respectively, and secured to lever 240. Cable 257*a* passes through cable-receiving hole 359, and cable fastening set 261*a* abuts, and may be attached to, housing 242*a*, with fastening set 261*a* received, at least in part, into cable-receiving hole 359.

Shaft 254 of rod 250 is inserted through, and received into, shaft-receiving channel 312 of lever 240, and first end 256 of rod 250 is inserted through central aperture 358 of first housing portion 242*a* and received into threaded insert 248 (when used) and hole 268 of configuration selector 246. Rod head 260 is seated in first rod-head receiving recess 314 or second rod-head receiving recess 316, depending on a rotational position of configuration selector 246, as will be described further below. As such, rod 250 is connected to configuration selector 246, through first housing portion 242*a* and lever 240.

A portion of lever 240 is received into lever-receiving recess 375 of first housing portion 242*a*. Channel 319 of lever 240 receives fastener-receiving portion 376*a* of first housing portion 242*a* and fastener-receiving portion 406*a* of second housing portion 242*b*, such that channel or groove surface 332 contacts one or both of fastener-receiving portions 376*a* and 406*a*.

First end 253 of spring 250 is received into spring-receiving cavity 263 of shaft head 260, and second end 255 of spring 250 is received into opening 422 of spring-end receiving portion 420 of second housing portion 242*b*.

Second housing portion 242*b* is adjacent to and abutting first horizontal grasping portion 220*a* of handle portion 218*a*, such that handle insertion portion 410 is inserted into opening 382, and first horizontal grasping portion 220*a* is received into first and second handle receiving recesses 400 and 402. Ends of fastener-receiving portions 406*a*, 406*b*, 406*c* and 406*d* respectively abut ends of fastener-receiving portions 376*a*, 376*b*, 376*c* and 376*d*. End 255 of spring 252 is receiving into opening 422 of second housing portion 242*b*.

A portion of lever 240 is received by lever-receiving recess 404.

Cable 257*b* passes through cable-receiving hole 405, and cable fastening set 261*b* abuts, and may be attached to, housing 242*b*, with fastening set 261*b* received, at least in part, into cable-receiving hole 405.

Fasteners 244 are received through holes 408, fastener-receiving portions 406*a*, 406*b*, 406*c* and 406*d* of second housing portion 242*a*, into fastener-receiving portions 376*a*, 376*b*, 376*c* and 376*d* of first housing portion 242*a*, and threadably connected to first housing portion 242*a*, thereby securing first housing portion 202*a* to first housing portion 242*b* with lever 240 therebetween, and both housing portions 242*a* and 242*b* to frame 202. See also, FIGS. 6-9 which depict safety-control device 200 as completely assembled to frame 202.

Referring again to FIGS. 6-7, safety-control device 200 is depicted in the first configuration, which is the wheels-down, walking configuration for use on a generally flat surface, i.e., not for use to climb stairs. In this configuration, lever 240 is in a first position, which is a lever down position.

Configuration selector is also in a first configuration-selector position, with raised portion 272 extending vertically, and aligned with, or pointing toward first icon 384, the "walk" icon. Configuration selector 246 may also be described as being in the 12 o'clock position.

In this first configuration, each of first pivoting wheel assembly 224*a* and second pivoting wheel assembly 224*b* are in their extended, non-pivoted positions, such that they each extend generally vertically, such that wheels 234*a* and 234*b* may be in contact with a walking surface which is being walked on by a user or patient using mobility device 199. In this configuration, portions of wheels 234*a* and 234*b* are also generally in the same plane as end 211*a* and 211*b* of legs 210*a* and 210*b*, respectively.

Figure 25:
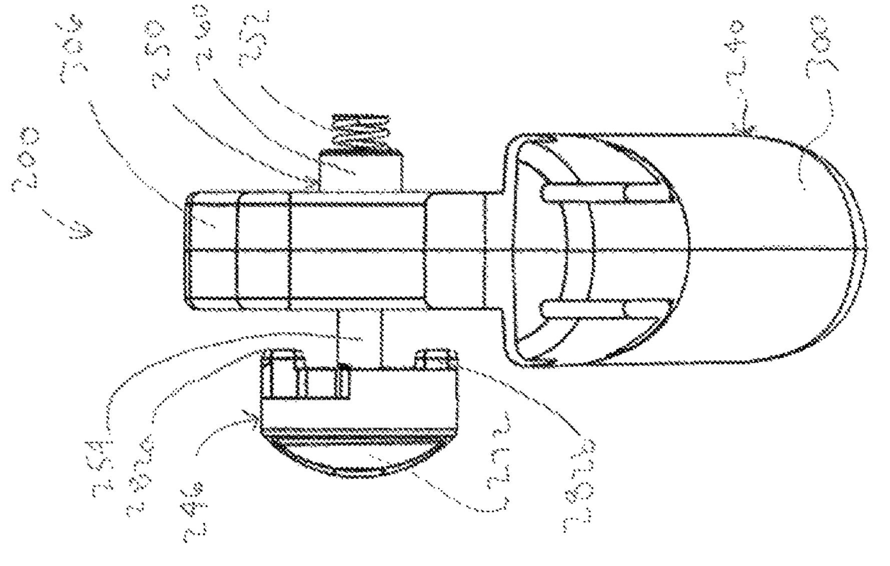
FIG. 25 is a front view of a lever, configuration selector, rod and spring in a first configuration.

Referring to FIG. 25, safety-control device 200 with housing portions 242*a* and 242*b* removed is depicted in the first configuration, i.e., wheels down and locked, walk configuration. In this first configuration, configuration selector 246 is in the 12 o'clock position (raised portion 272 extending vertically). As described above, rod 250 is secured to configuration selector 246.

Spring 252 is in head 260 of rod 250, with second spring end 253 protruding from head 260. Spring end 253 is also received into opening 422 of spring-receiving portion 420 of second housing portion 242*b* (see FIG. 21). In this first configuration, spring 252 is in a first compression state. In this first compression state, spring 252 may exert a first lateral spring force onto rod 250, or alternatively, spring 252 in this first compression state may not be compressed at all so as to not exert a lateral force onto rod 250. This first lateral force will be less than a second lateral force applied in an intermediate position of lever 240, as will be described further below.

Figure 28:
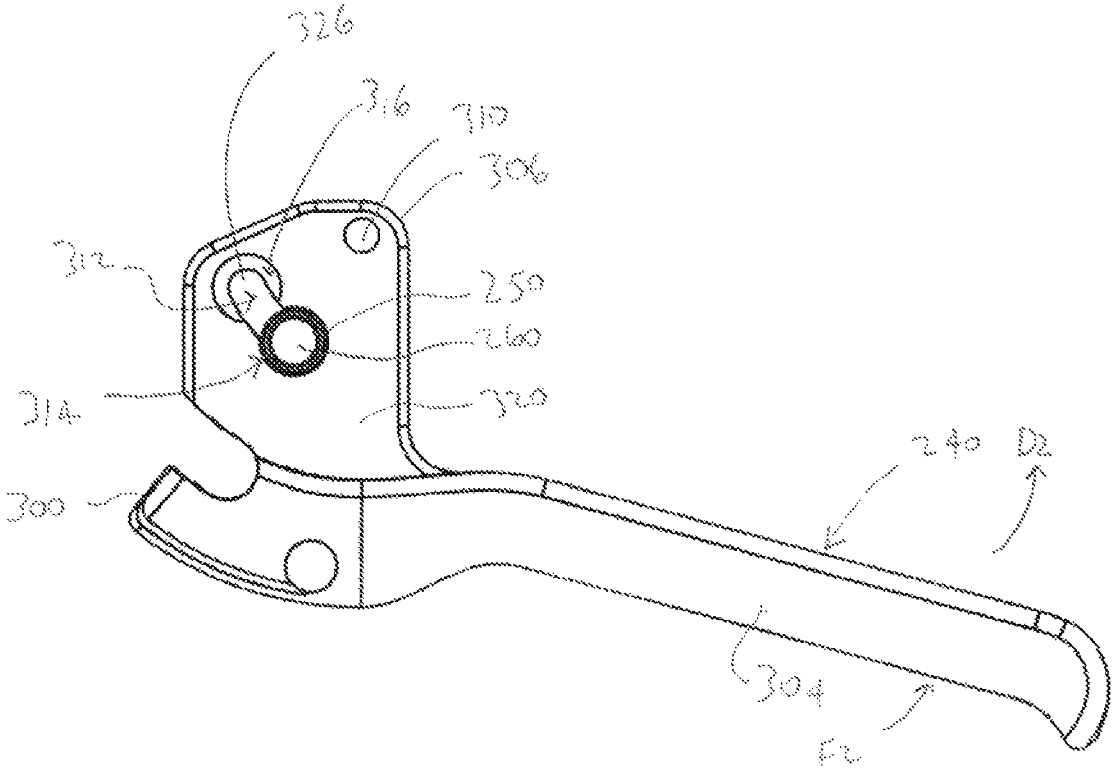
FIG. 28 is a view of a lever with rod head in a first configuration.

Referring also to FIG. 28, shaft 256 of rod 250 extends through first end 324 of channel 312 (see also FIG. 17), and a portion of head 260 of rod 250 is received into first rod-head-receiving recess 314. Because first rod-head-receiving recess 314 is recessed into, or countersunk into, first side 320 of base portion 306, and because diameter Dh of head 260 is larger than width Wc of channel 312, it is not possible to move lever 240 while any portion of head 260 is in first rod-head-receiving recess 314, i.e., lever 240 is locked in position. As explained further below, this means that rod 250 must be moved laterally such that head 250 exits first rod-head-receiving recess 314 so that lever 240 can be moved allowing shaft 254 to "travel" through channel 312 (a position of shaft 254 is actually fixed, and lever 240 with channel 312 is moved during operation).

Figure 19:
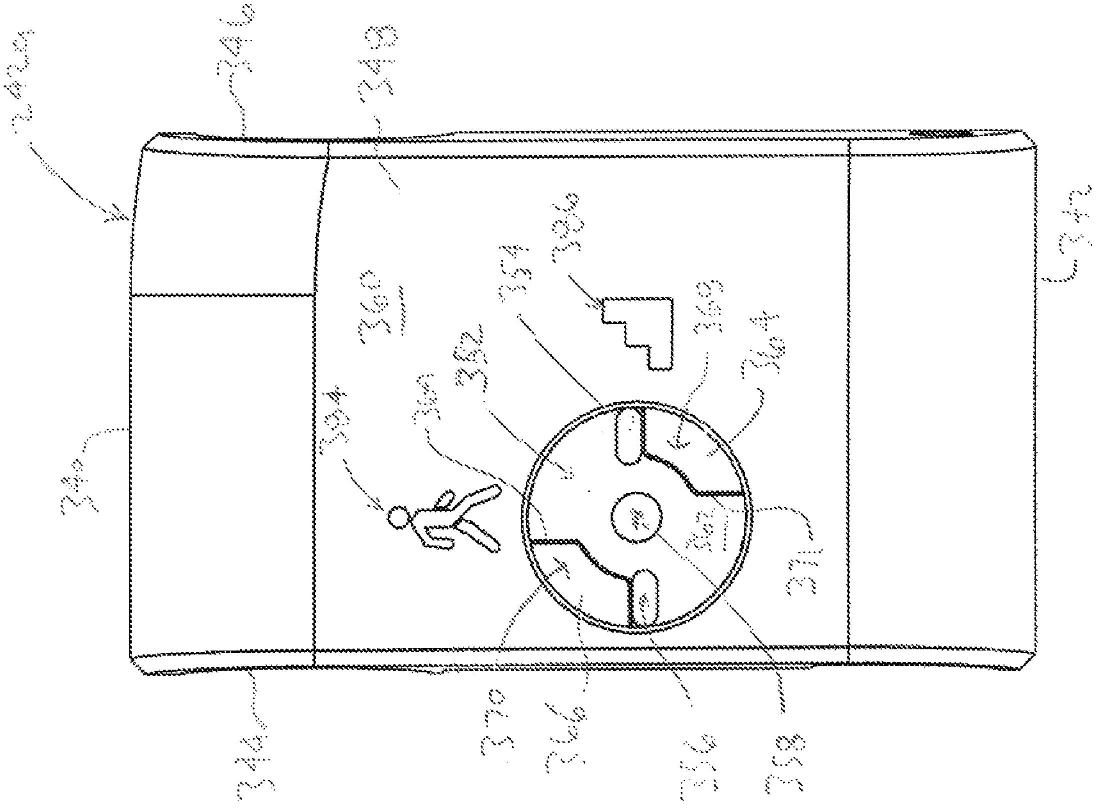
FIG. 19 is a front elevation view of a first housing portion of a safety-control device, according to an embodiment.

Referring to FIG. 25 again, as well as FIGS. 19 and 21, in the first configuration with configuration selector 246 located in the 12 o'clock position as depicted in FIG. 25, first projection portion 282*a* abuts side wall 369 of first raised limiter portion 364 and second projection portion 282*b* abuts side wall 371 of second raised limiter portion 366. As such, configuration selector 246 cannot be turned counter-clockwise from this rotational orientation of the first walk configuration.

Further, a portion of surface 276 of configuration selector 246 (see also FIG. 16) is adjacent to top surface 368 of first raised limiter portion 364, and another, opposite portion of surface 276 is adjacent to top surface 370 of second raised limiter portion 364, such that lateral movement of configuration selector 246 in a direction toward first housing portion 242*a* is limited or non-existent, i.e., configuration selector 246 cannot be pushed inward at all, or not very far. This also means that rod 250, which is connected to configuration selector 246, also cannot be moved laterally. In turn, rod head 260 cannot be pushed out of second rod-head-receiving recess 316, which prevents lever 240 from moving. As such, a patient cannot inadvertently change from the first configuration to the second configuration by simply, perhaps accidentally, pulling on lever 240, as lever 240 remains locked in place.

To change mobility device 199 from the first configuration to the second configuration, and as will be explained in further detail below, safety-control device 200 must be operated through a series of steps, which may be performed by a practitioner supervising or caring for a patient using mobility device 199. Operation includes rotating configuration selector 246 in a clockwise direction, pushing configuration selector 246 inwardly towards first housing 242*a*, pulling lever 240 upwards into a second locking position while holding configuration selector 246 in, then releasing configuration selector 246.

Figure 26:
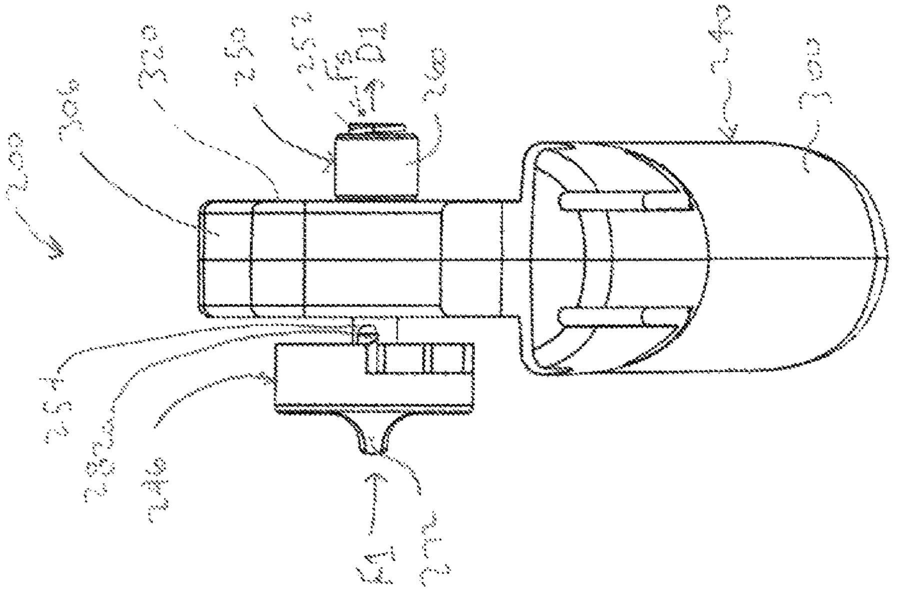
FIG. 26 is a front view of a lever, configuration selector, rod and spring in another configuration, with the configuration selector in a depressed position.

Referring to FIG. 26, safety-control device 200 (depicted without housing portions 242*a* and 242*b*) is in an intermediate position, which is a position achieved when configuring mobility device 199 and safety-control device 200 from the first wheels-down configuration to the second wheels-up configuration. In this intermediate position, configuration selector 246 has been firstly rotated, then depressed by exerting a force F1 onto configuration selector 246, such that configuration selector 246 and rod 250 have been translated laterally in a first direction D1 toward first housing portion 242*a*.

Simultaneously, spring 252 is compressed, exerting a spring force Fs opposite to force F1, such that when a user stops applying force F1 to configuration selector 246, configuration selector 246 will move in a direction opposite to D1, back to its original non-depressed position.

The lateral movement of configuration selector 246 and rod 250 causes rod head 260 to be displaced or removed from second rod-head recess 316, as can be seen in FIG. 26 which depicts the entire rod head 260 just past a plane defined by first side 320 of base portion 306 of lever 240.

As depicted, configuration selector 246 has been rotated clockwise 90° to a 3 o'clock or second configuration-selection position, causing an end of vertical portion 272 to be adjacent to second icon 386 that indicates the second configuration of mobility device 199 (also see FIG. 9 depicting configuration selector 246 aligned with second (stair) icon 386). Although configuration selector 246 is rotated 90° in this embodiment, from a 12 o'clock position to a 3 o'clock position, it will be understood that in other embodiments, the structure of safety-control device 200 could accommodate rotations of greater than or less than 90°.

Rotation of configuration selector 246 allows configuration selector 246 to be depressed as described above, by aligning configuration selector 246 with structural features of first housing portion 242*a* such that it can be pushed in.

Figure 12:
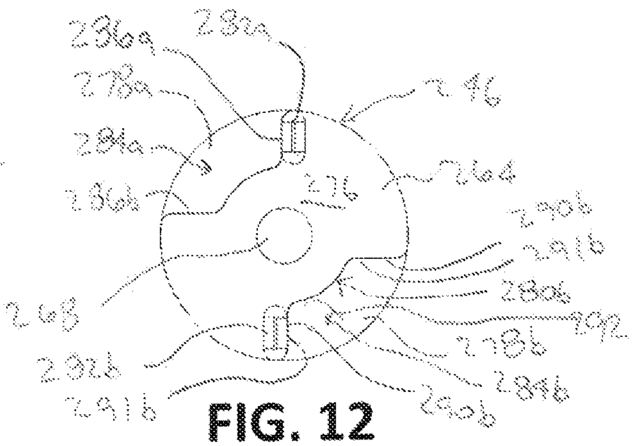
FIG. 12 is a rear elevation view of the configuration selector of FIG. 11.
Figure 13:
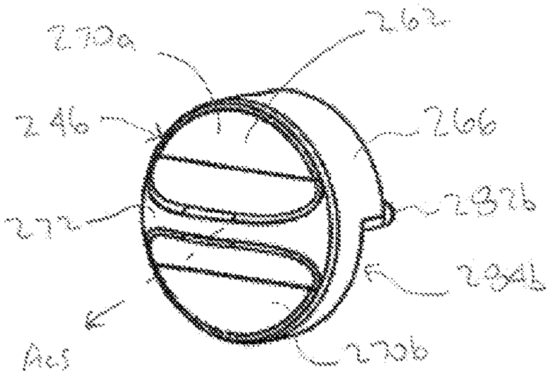
FIG. 13 is a front perspective view of the configuration selector of FIG. 11.
Figure 14:
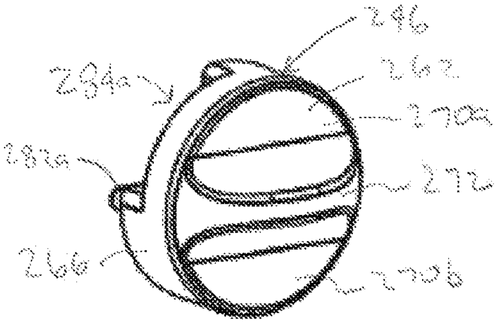
FIG. 14 is another front perspective view of the configuration selector of FIG. 11.
Figure 15:
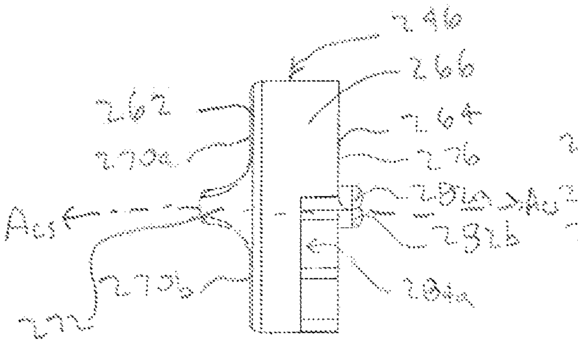
FIG. 15 is a right-side elevation view of the configuration selector of FIG. 11.
Figure 16:
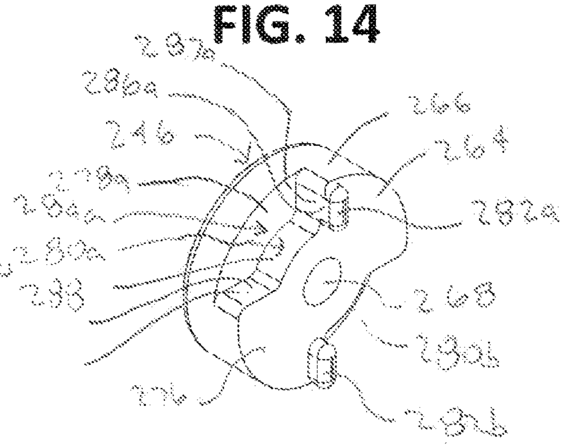
FIG. 16 is a rear perspective view of the configuration selector of FIG. 11.

More specifically, and referring also to FIGS. 12, 16 and 19, rotation of configuration selector 246 firstly causes first housing-stop recess 284*a* of configuration selector 246 to be laterally aligned (aligned along a generally horizontal axis) with first raised limiter portion 364, and second housing-stop recess 284*b* of configuration selector 246 to be laterally aligned with second raised limiter portion 366.

First projection portion 282*a* is also laterally aligned with first projection receiving hole 354 of first housing portion 242*a*, and second projection portion 282*b* is laterally aligned with second projection receiving hole 356.

Such alignment allows configuration selector 246 to be moved laterally into recess 352 of first housing portion 242*a*. If configuration selector 246 is not rotated and aligned as described, and force F1 is applied to configuration selector 246, configuration selector 246 would not move significantly as surface 264 of configuration selector 246 would contact first and second limiter portions 364 and 366, preventing movement of configuration selector 246. This prevention of lateral movement of configuration selector 246 also prevents movement of rod 250, such that rod head 260 would remain in second rod-head receiving recess 316, thereby preventing movement or actuation of lever 240 and wheel assemblies 224. A patient may thusly not accidentally push configuration selector 246 causing wheel assemblies 224*a* and 224*b* to be released and to pivot. Depending on a particular situation and patent, operation of safety-control device 200 may require assistance from a practitioner.

When configuration selector 246 is depressed by applying lateral force F1 in direction D1 after rotation as described above, first projection portion 282*a* is inserted into first projection receiving hole 354 of first housing portion 242*a*, and second projection portion 282*b* is inserted into second projection receiving hole 356.

Figure 29:
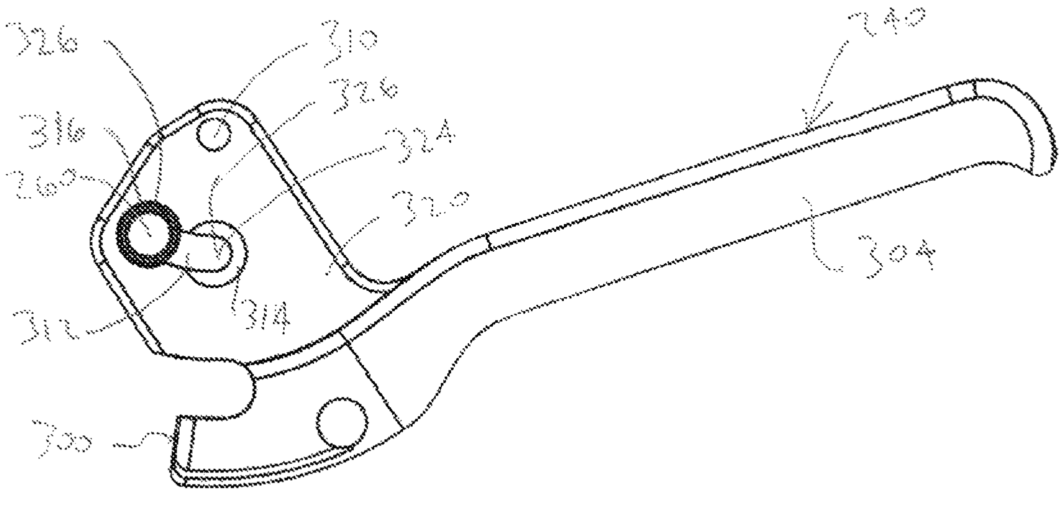
FIG. 29 is a view of the lever with rod head of FIG. 28, in a second configuration.

Referring also to FIGS. 28 and 29, with configuration selector 246 rotated and depressed, and rod head 260 displaced from second rod-head receiving recess 316, axial force F2 can be applied by a user or therapist to lever arm 304 of lever 240, causing lever arm 304 to move in upward direction D2, from a first lever position to a second lever position. Lever 240 and lever arm 304 pivot around handle insertion portions 380 and 410 of first and second housing portions 242*a* and 242*b*, respectively (see also FIGS. 21-22), which are in pivot hole 310.

Simultaneous with the movement of lever 240 and base portion 306, the position of shaft 254 of rod 250 is shifted from first end 324 of channel 312 to second end 326 of channel 312, also aligning rod head 260 with second rod-head receiving recess 316, as depicted in FIG. 29.

Figure 27:
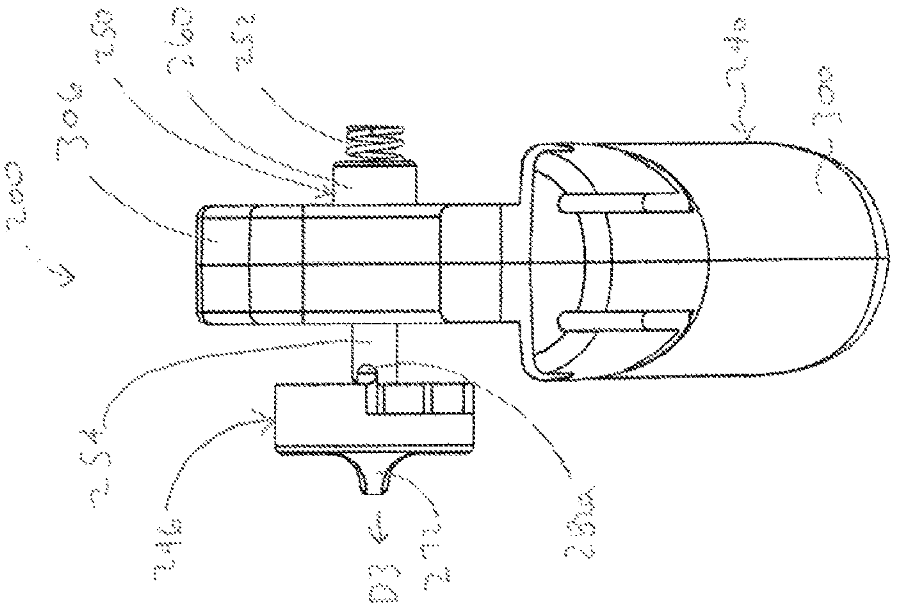
FIG. 27 is a front view of a lever, configuration selector, rod and spring in a second configuration, with the configuration selector in a non-depressed, rotated position.

Applying force F2 to pivot lever 240 upwards also exerts a pulling force onto first and second cables 257*a* and 257*b* (see also FIG. 10). Pulling on cables 257*a* and 257*b* releases a locking mechanism (not depicted) for pivoting wheel assemblies 224*a* and 224*b* allowing pivoting wheel assemblies 224*a* and 224*b* to pivot about pivot joints 236*a* and 236*b* to a second leg position. A spring assist mechanism, not depicted, may exert a spring force on pivoting wheel assemblies 224*a* and 224*b* after the locking mechanism is released, thereby moving pivoting wheel assemblies 224*a* and 224*b* to the second leg position and into the second configuration of mobility device 199 such that mobility device 199 may be used for climbing stairs. Such locking mechanisms are known in the art, and may comprise a spring-loaded pin or other mechanism. Spring assist mechanisms used for moving pivoting wheel assemblies are also known in the art. Examples of such mechanisms are described in U.S. Pat. No. 10,278,884, issued May 7, 2019, and entitled "Ambulatory Assistance Apparatus Adaptable for a Staircase," which is incorporated herein by reference in its entirety. Referring also to FIG. 27, when lever 240 is positioned as depicted in FIG. 29, a user may release configuration selector 246 by ceasing applying force F1, causing the compression force Fs of spring 252 to move rod 250 and configuration selector 246 laterally in direction D3, back to the non-depressed configuration-selector position. This lateral movement of rod 250 causes rod head 260 to be received into second rod-head receiving recess 316, locking lever 240 in the upward position depicted in FIG. 29, which corresponds to the second, wheels-up, configuration of mobility device 199. Tension remains on cables 257*a* and 257*b*, such that pivoting wheel assemblies 224*a* and 224*b* are held up and in the position depicted in FIG. 8, which depicts the second, stair-climb, configuration of mobility device 199.

As described above, with configuration selector 246 and rod 250 in the non-depressed position with rod head 260 in recess 316 as depicted in FIGS. 27 and 29, lever 240 and pivoting wheel assemblies 224*a* and 224*b* are locked in the second configuration as depicted in FIG. 9. In this configuration, lever 240 cannot be moved, thereby releasing pivoting wheel assemblies 224*a* and 224*b*, unless configuration selector 246 is also depressed. This prevents accidental release and movement of pivoting wheel assemblies 224*a* and 224*b*, i.e., inadvertent change from the second configuration to the first configuration.

To change mobility device 199 from the second, wheels-up, configuration (FIGS. 8-9) to the first, wheels-down configuration (FIGS. 6-7), a user must apply a lateral force, such as force F1 as depicted in FIG. 26 to configuration selector 246, thereby causing rod head 260 to be displaced from second rod-head receiving recess 316 of lever 240. At this point, lever 240 can then be pivoted from the second position of FIG. 29 to the first position of FIG. 28, and pivoting wheel assemblies 224*a* and 224*b* can simultaneously pivot downward to the first, walk configuration. In an embodiment, and as described briefly above, cables 257*a* and 257*b* will be under tension when pivoting wheel assemblies 224*a* and 224*b* are in the up or second configuration, such that when released, a combination of gravity and spring tension from the spring-assist mechanism pivot wheel assemblies 224*a* and 224*b* downwards, pulling first end 300 of lever 240 and moving lever 240 to the second configuration as depicted in FIG. 28.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A mobility device configurable in a first configuration for assisting a user to traverse a flat surface, and configurable in a second configuration for assisting a user to climb stairs, the mobility device comprising:

a frame;

a leg-actuation system; and a safety-control device configured to control switching of the mobility device between the first and second configurations;

wherein the safety-control device includes a lever connected to the leg-actuation system and movable between a first lever position and a second lever position, the lever configured to actuate the leg-actuation system, and includes a configuration selector that is movable between the first configuration-selector position, the second configuration-selector position, and a third configuration-selector position.

2. The mobility device of claim 1, wherein the lever is movable from the first lever position to the second lever position when the configuration selector is in the third configuration-selector position, and wherein the mobility device is in the second configuration when the lever is in the second lever position, first and second movable leg portions are in the second leg position, and the configuration-selector is in the second configuration-selector position.

3. The mobility device of claim 2, wherein the configuration selector is movable between the first configuration-selector position and the second configuration-selector position by rotating the configuration selector about a configuration-selector axis.

4. The mobility device of claim 3, wherein the configuration selector is movable between the second configuration-selector position and the third configuration-selector position by moving the configuration selector along the configuration-selector axis.

5. The mobility device of claim 3, wherein the configuration selector is subjected to an axial spring force in a first axial direction when in the third configuration-selector position, such that an axial force applied in a second axial direction that is opposite to the first axial direction is required so as to maintain the configuration selector in the third configuration-selector position, thereby allowing the lever to be moved from the first lever position to the second lever position.

6. The mobility device of claim 1, wherein the configuration selector includes a rotatable knob.

7. The mobility device of claim 1, wherein the frame includes first and second movable leg portions actuatable by the leg-actuation system, each of the first and second movable leg portions comprising a pivoting leg portion, and each pivoting leg portion including a wheel, and the leg-actuation system comprising one or more cables.

8. A safety-control device for a mobility device that includes a pair of movable front legs, the mobility device configurable in a first configuration such that the movable front legs are in a first leg position, and configurable in a second configuration such that the movable front legs are in a second leg position, the safety-control device comprising a configuration selector, a housing, a lever movable between a first lever position and a second lever position, the lever configured to actuate the leg-actuation system so as to cause the first and second movable leg portions to move from the first leg position to the second leg position when the lever is moved from the first lever position to the second lever position;

wherein the lever is in a locked in place while in the first lever position such that the lever cannot be moved from the first lever position to the second lever position, thereby preventing movement of the first and second movable leg portions from the first leg position to the second leg position, when the configuration selector is in the first configuration-selector position; and wherein the configuration selector is movable between the second configuration-selector position by moving the configuration selector axially to the third configuration-selector position.

9. The safety-control device of claim 8, wherein the configuration selector is subjected to an axial spring force in a first axial direction when in the third configuration-selector position, such that an axial force applied in a second axial direction that is opposite to the first axial direction is required so as to maintain the configuration selector in the third configuration-selector position, thereby allowing the lever to be moved from the first lever position to the second lever position.

10. A mobility device configurable in a first configuration for assisting a user to traverse a flat surface, and configurable in a second configuration for assisting a user to climb stairs, the mobility device comprising:

a frame;

a leg-actuation system; and a safety-control device configured to control switching of the mobility device between the first and second configurations;

wherein the safety control device includes a configuration selector with a rotatable knob.

11. The mobility device of claim 10, wherein the safety-control device includes a lever connected to the leg-actuation system and movable between a first lever position and a second lever position, the lever configured to actuate the leg-actuation system.

12. The mobility device of claim 10, wherein the configuration selector is movable between the first configuration-selector position, the second configuration-selector position, and a third configuration-selector position.

13. The mobility device of claim 10, wherein the lever is movable from the first lever position to the second lever position when the configuration selector is in a third configuration-selector position, and wherein the mobility device is in the second configuration when the lever is in the second lever position, first and second movable leg portions are in the second leg position, and the configuration-selector is in the second configuration-selector position.

14. The mobility device of claim 13, wherein the configuration selector is movable between the first configuration-selector position and the second configuration-selector position by rotating the configuration selector about a configuration-selector axis.

15. The mobility device of claim 14, wherein the configuration selector is movable between the second configuration-selector position and the third configuration-selector position by moving the configuration selector along the configuration-selector axis.

16. The mobility device of claim 14, wherein the configuration selector is subjected to an axial spring force in a first axial direction when in the third configuration-selector position, such that an axial force applied in a second axial direction that is opposite to the first axial direction is required so as to maintain the configuration selector in the third configuration-selector position, thereby allowing the lever to be moved from the first lever position to the second lever position.

17. A mobility device configurable in a first configuration for assisting a user to traverse a flat surface, and configurable in a second configuration for assisting a user to climb stairs, the mobility device comprising:

a frame;

a leg-actuation system; and a safety-control device configured to control switching of the mobility device between the first and second configurations;

wherein the frame includes first and second movable leg portions each of the first and second movable leg portions comprising a pivoting leg portion, and each pivoting leg portion including a wheel, and the leg-actuation system comprising one or more cables.

18. The mobility device of claim 17, wherein the safety-control device includes a lever connected to the leg-actuation system and movable between a first lever position and a second lever position, the lever configured to actuate the leg-actuation system.

19. The mobility device of claim 18, wherein the safety-control device includes a configuration selector that is movable between the first configuration-selector position, the second configuration-selector position, and a third configuration-selector position.

20. The mobility device of claim 19, wherein the lever is movable from the first lever position to the second lever position when the configuration selector is in the third configuration-selector position, and wherein the mobility device is in the second configuration when the lever is in the second lever position, first and second movable leg portions are in the second leg position, and the configuration-selector is in the second configuration-selector position.

21. The mobility device of claim 20, wherein the configuration selector is movable between the first configuration-selector position and the second configuration-selector position by rotating the configuration selector about a configuration-selector axis.

22. The mobility device of claim 21, wherein the configuration selector is movable between the second configuration-selector position and the third configuration-selector position by moving the configuration selector along the configuration-selector axis.

23. The mobility device of claim 22, wherein the configuration selector is subjected to an axial spring force in a first axial direction when in the third configuration-selector position, such that an axial force applied in a second axial direction that is opposite to the first axial direction is required so as to maintain the configuration selector in the third configuration-selector position, thereby allowing the lever to be moved from the first lever position to the second lever position.

24. The mobility device of claim 17, wherein the safety-control device includes a configuration selector with a rotatable knob.

* * * * *